United States Patent
Bessler et al.

(10) Patent No.: US 9,898,743 B2
(45) Date of Patent: Feb. 20, 2018

(54) SYSTEMS AND METHODS FOR AUTOMATIC GENERATION OF A RELATIONSHIP MANAGEMENT SYSTEM

(71) Applicant: salesforce.com, inc., San Francisco, CA (US)

(72) Inventors: Scott Bessler, Mt. View, CA (US); Patricio Echague, Burlingame, CA (US); Adam Evans, Redwood City, CA (US); Andrea Hawksley, Menlo Park (CA); Gary Lerhaupt, San Francisco, CA (US); Jason Li, Mt. View, CA (US); Steve Loughlin, Los Altos, CA (US); Kunal Punera, San Francisco, CA (US)

(73) Assignee: salesforce.com, inc., San Francisco, CA (US)

( * ) Notice: Subject to any disclaimer, the term of this patent is extended or adjusted under 35 U.S.C. 154(b) by 518 days.

(21) Appl. No.: 14/050,125

(22) Filed: Oct. 9, 2013

(65) Prior Publication Data
US 2015/0100356 A1    Apr. 9, 2015

(51) Int. Cl.
*G06Q 10/00* (2012.01)
*G06Q 30/00* (2012.01)
*G06Q 10/06* (2012.01)

(52) U.S. Cl.
CPC ......... *G06Q 30/01* (2013.01); *G06Q 10/0631* (2013.01)

(58) Field of Classification Search
CPC ........ G06Q 10/00; G06Q 40/00; G06Q 30/01; G06Q 10/0631; G06F 17/60
USPC ................................................. 705/7.12–7.24
See application file for complete search history.

(56) References Cited

U.S. PATENT DOCUMENTS

| | | |
|---|---|---|
| 5,577,188 A | 11/1996 | Zhu |
| 5,608,872 A | 3/1997 | Schwartz et al. |
| 5,649,104 A | 7/1997 | Carleton et al. |
| 5,715,450 A | 2/1998 | Ambrose et al. |
| 5,761,419 A | 6/1998 | Schwartz et al. |
| 5,819,038 A | 10/1998 | Carleton et al. |
| 5,821,937 A | 10/1998 | Tonelli et al. |

(Continued)

OTHER PUBLICATIONS

Final Office Action for U.S. Appl. No. 14/080,076, dated Oct. 17, 2016, 70 pages.

(Continued)

*Primary Examiner* — Romain Jeanty
(74) *Attorney, Agent, or Firm* — Alpine Technology Law Group LLC

(57) ABSTRACT

A method and apparatus for the automatic creation of a relationship management system is described. The method may include receiving a request from a user to create a relationship management system, and receiving specification of one or more electronic communication systems and user access credentials that provide access to each of the corresponding accounts. Furthermore, the method may include obtaining past electronic communications using the received user access credentials and analyzing the past electronic communications to extract contact data. The method may also include creating the relationship management system for the user and adding the contact data as contacts associated with the user in the created relationship management system.

41 Claims, 11 Drawing Sheets

(56) References Cited

U.S. PATENT DOCUMENTS

| | | |
|---|---|---|
| 5,831,610 A | 11/1998 | Tonelli et al. |
| 5,873,096 A | 2/1999 | Lim et al. |
| 5,918,159 A | 6/1999 | Fomukong et al. |
| 5,963,953 A | 10/1999 | Cram et al. |
| 6,092,083 A | 7/2000 | Brodersen et al. |
| 6,169,534 B1 | 1/2001 | Raffel et al. |
| 6,178,425 B1 | 1/2001 | Brodersen et al. |
| 6,189,011 B1 | 2/2001 | Lim et al. |
| 6,216,135 B1 | 4/2001 | Brodersen et al. |
| 6,233,617 B1 | 5/2001 | Rothwein et al. |
| 6,266,669 B1 | 7/2001 | Brodersen et al. |
| 6,295,530 B1 | 9/2001 | Ritchie et al. |
| 6,324,568 B1 | 11/2001 | Diec |
| 6,324,693 B1 | 11/2001 | Brodersen et al. |
| 6,336,137 B1 | 1/2002 | Lee et al. |
| D454,139 S | 3/2002 | Feldcamp |
| 6,367,077 B1 | 4/2002 | Brodersen et al. |
| 6,393,605 B1 | 5/2002 | Loomans |
| 6,405,220 B1 | 6/2002 | Brodersen et al. |
| 6,434,550 B1 | 8/2002 | Warner et al. |
| 6,446,089 B1 | 9/2002 | Brodersen et al. |
| 6,535,909 B1 | 3/2003 | Rust |
| 6,549,908 B1 | 4/2003 | Loomans |
| 6,553,563 B2 | 4/2003 | Ambrose et al. |
| 6,560,461 B1 | 5/2003 | Fomukong et al. |
| 6,574,635 B2 | 6/2003 | Stauber et al. |
| 6,577,726 B1 | 6/2003 | Huang et al. |
| 6,601,087 B1 | 7/2003 | Zhu et al. |
| 6,604,117 B2 | 8/2003 | Lim et al. |
| 6,604,128 B2 | 8/2003 | Diec |
| 6,609,150 B2 | 8/2003 | Lee et al. |
| 6,621,834 B1 | 9/2003 | Scherpbier et al. |
| 6,654,032 B1 | 11/2003 | Zhu et al. |
| 6,665,648 B2 | 12/2003 | Brodersen et al. |
| 6,665,655 B1 | 12/2003 | Warner et al. |
| 6,684,438 B2 | 2/2004 | Brodersen et al. |
| 6,711,565 B1 | 3/2004 | Subramaniam et al. |
| 6,724,399 B1 | 4/2004 | Katchour et al. |
| 6,728,702 B1 | 4/2004 | Subramaniam et al. |
| 6,728,960 B1 | 4/2004 | Loomans |
| 6,732,095 B1 | 5/2004 | Warshaysky et al. |
| 6,732,100 B1 | 5/2004 | Brodersen et al. |
| 6,732,111 B2 | 5/2004 | Brodersen et al. |
| 6,754,681 B2 | 6/2004 | Brodersen et al. |
| 6,763,351 B1 | 7/2004 | Subramaniam et al. |
| 6,763,501 B1 | 7/2004 | Zhu et al. |
| 6,768,904 B2 | 7/2004 | Kim |
| 6,782,383 B2 | 8/2004 | Subramaniam et al. |
| 6,804,330 B1 | 10/2004 | Jones et al. |
| 6,826,565 B2 | 11/2004 | Ritchie et al. |
| 6,826,582 B1 | 11/2004 | Chatterjee et al. |
| 6,826,745 B2 | 11/2004 | Coker et al. |
| 6,829,655 B1 | 12/2004 | Huang et al. |
| 6,842,748 B1 | 1/2005 | Warner et al. |
| 6,850,895 B2 | 2/2005 | Brodersen et al. |
| 6,850,949 B2 | 2/2005 | Warner et al. |
| 7,289,976 B2 | 10/2007 | Kihneman et al. |
| 7,340,411 B2 | 3/2008 | Cook |
| 7,620,655 B2 | 11/2009 | Larsson et al. |
| 8,332,440 B2 | 12/2012 | Parker, III et al. |
| 8,429,518 B2 | 4/2013 | MacHalek |
| 2001/0044791 A1 | 11/2001 | Richter et al. |
| 2002/0022986 A1 | 2/2002 | Coker et al. |
| 2002/0029161 A1 | 3/2002 | Brodersen et al. |
| 2002/0029376 A1 | 3/2002 | Ambrose et al. |
| 2002/0035577 A1 | 3/2002 | Brodersen et al. |
| 2002/0042264 A1 | 4/2002 | Kim |
| 2002/0042843 A1 | 4/2002 | Diec |
| 2002/0072951 A1 | 6/2002 | Lee et al. |
| 2002/0082892 A1 | 6/2002 | Raffel et al. |
| 2002/0129352 A1 | 9/2002 | Brodersen et al. |
| 2002/0140731 A1 | 10/2002 | Subramaniam et al. |
| 2002/0143997 A1 | 10/2002 | Huang et al. |
| 2002/0152102 A1 | 10/2002 | Brodersen et al. |
| 2002/0161734 A1 | 10/2002 | Stauber et al. |
| 2002/0162090 A1 | 10/2002 | Parnell et al. |
| 2002/0165742 A1 | 11/2002 | Robins |
| 2003/0004971 A1 | 1/2003 | Gong et al. |
| 2003/0018705 A1 | 1/2003 | Chen et al. |
| 2003/0018830 A1 | 1/2003 | Chen et al. |
| 2003/0066031 A1 | 4/2003 | Laane |
| 2003/0066032 A1 | 4/2003 | Ramachadran et al. |
| 2003/0069936 A1 | 4/2003 | Warner et al. |
| 2003/0070000 A1 | 4/2003 | Coker et al. |
| 2003/0070004 A1 | 4/2003 | Mukundan et al. |
| 2003/0070005 A1 | 4/2003 | Mukundan et al. |
| 2003/0074418 A1 | 4/2003 | Coker |
| 2003/0088545 A1 | 5/2003 | Subramaniam et al. |
| 2003/0120675 A1 | 6/2003 | Stauber et al. |
| 2003/0151633 A1 | 8/2003 | George et al. |
| 2003/0159136 A1 | 8/2003 | Huang et al. |
| 2003/0187921 A1 | 10/2003 | Diec |
| 2003/0189600 A1 | 10/2003 | Gune et al. |
| 2003/0191743 A1 | 10/2003 | Brodersen et al. |
| 2003/0204427 A1 | 10/2003 | Gune et al. |
| 2003/0206192 A1 | 11/2003 | Chen et al. |
| 2003/0225730 A1 | 12/2003 | Warner et al. |
| 2004/0001092 A1 | 1/2004 | Rothwein et al. |
| 2004/0010489 A1 | 1/2004 | Rio |
| 2004/0015981 A1 | 1/2004 | Coker et al. |
| 2004/0027388 A1 | 2/2004 | Berg et al. |
| 2004/0039814 A1 | 2/2004 | Crabtree et al. |
| 2004/0128001 A1 | 7/2004 | Levin et al. |
| 2004/0186860 A1 | 9/2004 | Lee et al. |
| 2004/0193510 A1 | 9/2004 | Catahan, Jr. et al. |
| 2004/0199489 A1 | 10/2004 | Barnes-Leon et al. |
| 2004/0199536 A1 | 10/2004 | Barnes-Leon et al. |
| 2004/0199543 A1 | 10/2004 | Braud et al. |
| 2004/0249854 A1 | 12/2004 | Barnes-Leon et al. |
| 2004/0260534 A1 | 12/2004 | Pak et al. |
| 2004/0260659 A1 | 12/2004 | Chan et al. |
| 2004/0268299 A1 | 12/2004 | Lei et al. |
| 2005/0050555 A1 | 3/2005 | Exley et al. |
| 2005/0091098 A1 | 4/2005 | Brodersen et al. |
| 2005/0132069 A1 | 6/2005 | Shannon et al. |
| 2007/0061421 A1 | 3/2007 | Karidi |
| 2007/0203820 A1* | 8/2007 | Rashid ............... G06Q 30/02 705/37 |
| 2008/0059314 A1 | 3/2008 | Kirchoff et al. |
| 2008/0114628 A1 | 5/2008 | Johnson et al. |
| 2008/0320001 A1 | 12/2008 | Gaddam |
| 2009/0063242 A1 | 3/2009 | Shaouy |
| 2009/0177744 A1 | 7/2009 | Marlow et al. |
| 2009/0187515 A1 | 7/2009 | Andrew et al. |
| 2009/0313067 A1 | 12/2009 | Costa et al. |
| 2010/0094878 A1 | 4/2010 | Soroca et al. |
| 2010/0257470 A1 | 10/2010 | Ari et al. |
| 2011/0010236 A1 | 1/2011 | Trillana |
| 2011/0022536 A1* | 1/2011 | Shivers ............... G06Q 20/10 705/344 |
| 2011/0047147 A1* | 2/2011 | Shivers ............... G06Q 20/10 707/722 |
| 2011/0066949 A1 | 3/2011 | Deluca et al. |
| 2011/0206198 A1 | 8/2011 | Freedman et al. |
| 2011/0218912 A1* | 9/2011 | Shivers ............... G06Q 20/108 705/42 |
| 2012/0072500 A1 | 3/2012 | Greene et al. |
| 2012/0079092 A1 | 3/2012 | Woxblom et al. |
| 2012/0150888 A1 | 6/2012 | Hyatt et al. |
| 2012/0150978 A1 | 6/2012 | Monaco et al. |
| 2012/0173452 A1* | 7/2012 | Dodge ............. G06Q 10/06375 705/348 |
| 2013/0007036 A1 | 1/2013 | Childs et al. |
| 2013/0030873 A1 | 1/2013 | Davidson |
| 2013/0067039 A1 | 3/2013 | Hartzler et al. |
| 2013/0305169 A1 | 11/2013 | Gold |
| 2013/0339099 A1 | 12/2013 | Aidroos |
| 2014/0229214 A1 | 8/2014 | Bernier et al. |
| 2014/0258363 A1 | 9/2014 | Peco et al. |
| 2015/0100356 A1 | 4/2015 | Bessler et al. |
| 2015/0120587 A1 | 4/2015 | Bramel et al. |
| 2016/0094414 A1 | 3/2016 | Merenda et al. |

(56) References Cited

U.S. PATENT DOCUMENTS

OTHER PUBLICATIONS

Final Office Action for U.S. Appl. No. 15/005,992, dated May 4, 2017, 7 pages.
Non-Final Office Action for U.S. Appl. No. 14/080,076 dated Feb. 10, 2016, 58 pages.
Non-Final Office Action for U.S. Appl. No. 14/080,076 dated Mar. 31, 2017, 73 pages.
Non-Final Office Action for U.S. Appl. No. 14/193,594 dated Apr. 14, 2015, 5 pages.
Non-Final Office Action for U.S. Appl. No. 15/005,992 dated Dec. 15, 2016, 11 pages.
Notice of Allowance for U.S. Appl. No. 14/193,594 dated Sep. 15, 2015, 7 pages.
Final Office Action for U.S. Appl. No. 14/080,076, dated Nov. 2, 2017, 77 pages.
Notice of Allowance for U.S. Appl. No. 15/005,992, dated Sep. 18, 2017, 7 pages.
Robin Wauters, Seedcamp graduate Kwaga raises 1.55 million for 'email assistant' WriteThat. Name, 1, Jan. 12, 2012 , TechCrunch , http://techcrunch.com/2012/01/12/seedcamp-graduate-kwaga-raises-1-55-million-for-email-assistant-writethat-name/.†
Writethat.name, WriteThat.Name home page, 1, Oct. 6, 2012, Writethat.name, https://web.archive.org/web/20121006164901/http://writethat.name/.†

\* cited by examiner
† cited by third party

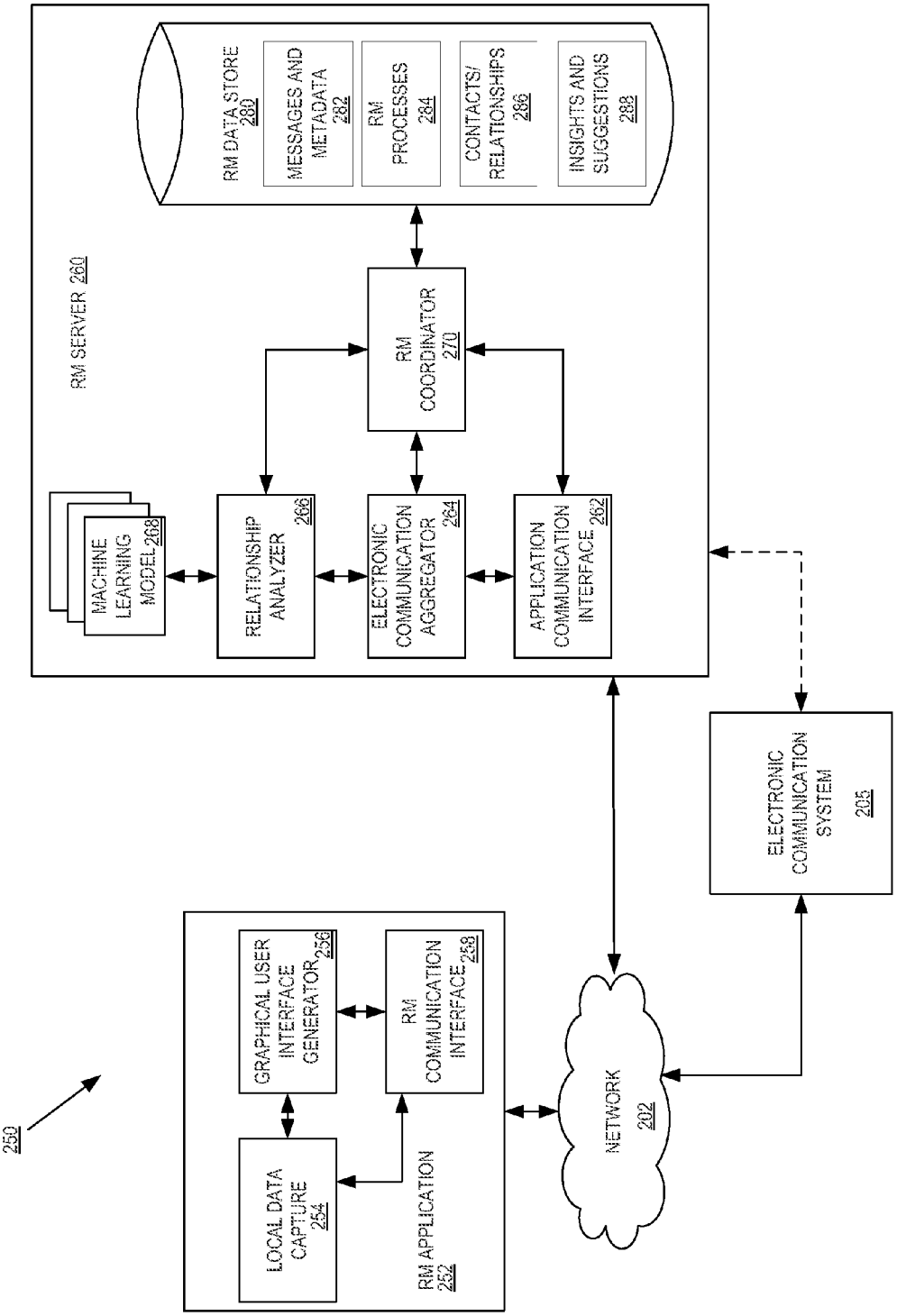

SYSTEMS AND METHODS FOR AUTOMATIC GENERATION OF A RELATIONSHIP MANAGEMENT SYSTEM

TECHNICAL FIELD

Embodiments of the invention relate to the field of electronic communication management, and more particularly, to creating a relationship management system.

BACKGROUND

Customer relationship management (CRM) systems provide tools for managing interactions with customers. The interactions may include interactions of a single user with a customer, such as the exchange of telephone calls, emails, in-person meetings, as well as other types of interactions. The interactions may also include the interactions of other users, such as multiple employees from a company, office, school, etc., interacting with a customer. CRM solutions collect a centralized record of these interactions. From the record of the interactions, CRM systems attempt to summarize and track the interactions in a meaningful way.

Typically, the interactions are manually collected and stored in a CRM. That is, contacts must be manually entered by users into a CRM system as customer contact information. Then, a user is required to log into a CRM system and send email communications to a customer through the CRM system in order to record the existence of the communication. Alternatively, a user may communicate with a customer outside of the CRM system, but is then tasked with the manual process of logging the communication into the CRM system by selecting a customer, selecting a communication, and storing the communication in the CRM system. Such tasks are tedious, and rely on the constant attention of users in a company, organization, school, etc. to continually depart from their typical work activities in order to log events into the CRM system. As a result, users often choose to delay entry of contacts and communications into a CRM system in favor of their actual work, or forget to enter the contacts and/or communications altogether. The resulting CRM system records are therefore often incomplete, inaccurate, out of date, and not easily adopted by those intended to benefit from the CRM system.

BRIEF DESCRIPTION OF THE DRAWINGS

The present invention will be understood more fully from the detailed description given below and from the accompanying drawings of various embodiments of the invention, which, however, should not be taken to limit the invention to the specific embodiments, but are for explanation and understanding only.

FIG. 2B is a block diagram of one embodiment of a relationship management server and a relationship management application run on a user system.

DETAILED DESCRIPTION

Figure 1:
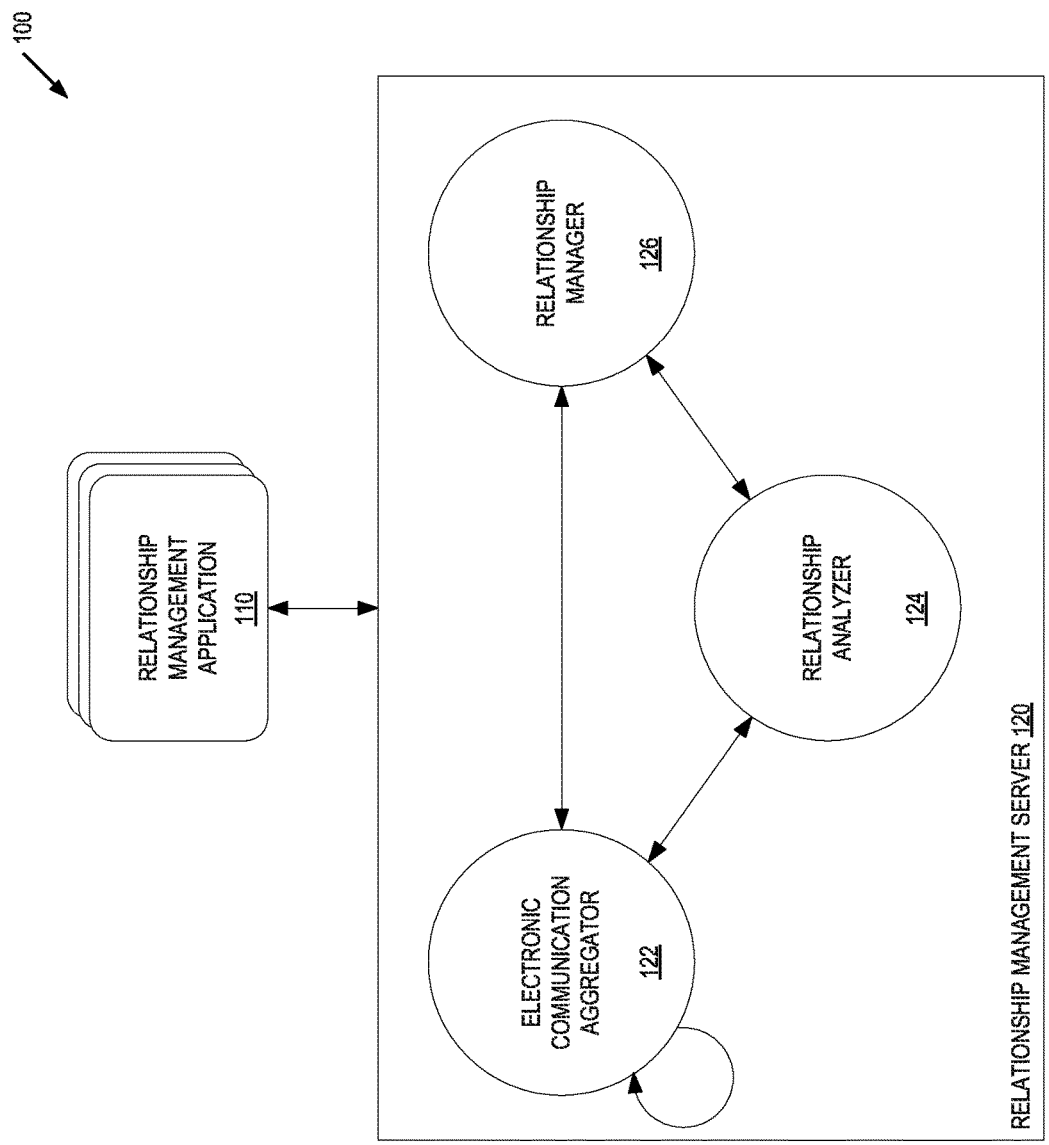
FIG. 1 is a block diagram illustrating an exemplary system for automatic and intelligent relationship management in accordance with an embodiment of the invention.

In the following description, numerous details are set forth. It will be apparent, however, to one of ordinary skill in the art having the benefit of this disclosure, that the present invention may be practiced without these specific details. In some instances, well-known structures and devices are shown in block diagram form, rather than in detail, in order to avoid obscuring the present invention.

Some portions of the detailed description that follow are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the following discussion, it is appreciated that throughout the description, discussions utilizing terms such as "receiving", "obtaining", "analyzing", "creating", "adding", "determining", "filtering", "refining", or the like, refer to the actions and processes of a computer system, or similar electronic computing device, that manipulates and transforms data represented as physical (e.g., electronic) quantities within the computer system's registers and memories into other data similarly represented as physical quantities within the computer system memories or registers or other such information storage, transmission or display devices.

The present invention also relates to an apparatus for performing the operations herein. This apparatus may be specially constructed for the required purposes, or it may comprise a general-purpose computer selectively activated or reconfigured by a computer program stored in the computer. Such a computer program may be stored in a computer readable storage medium, such as, but not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions.

The algorithms and displays presented herein are not inherently related to any particular computer or other apparatus. Various general-purpose systems may be used with programs in accordance with the teachings herein, or it may prove convenient to construct a more specialized apparatus to perform the required method steps. The required structure for a variety of these systems will appear from the description below. In addition, the present invention is not described with reference to any particular programming language. It will be appreciated that a variety of programming languages may be used to implement the teachings of the invention as described herein.

FIG. 1 is a block diagram illustrating an exemplary system 100 for automatic and intelligent relationship management. In embodiments discussed herein, relationship management involves the capture, analysis, and reporting of communications between a single user, or multiple users, within an organization, and various contacts outside of the organization. When a user engages in communication, in concert with a group of users, from an organization, those users are said to be collaborators. Furthermore, when the user and/or collaborators engage in communication with contacts outside the organization for a specific purpose (e.g., sales, business, recruiting, funding, etc.), a relationship is formed. These communications, between relationships and collaborators, may be part of a series of sequential communication and action stages of a process, such as stages of a sales process (e.g., first contact, product demo, price quote, offer, close), a business development process (e.g., growth identification, partner identification, project assignment, growth tracking), a recruiting process (e.g., candidate contact, resume obtained, initial interview, follow-up interview, offer or decline), as well as other processes which are, or can, be carried out with electronic communications. These communications, once identified as belonging to one or more processes, may then be viewed by users and collaborators involved in the particular process. Furthermore, reports may be generated which summarize, provide different visualizations, show progression within a process, and provide feedback on the progression within a process.

In one embodiment, the system 100 for automatic and intelligent relationship management automatically performs various relationship management tasks, such as obtaining electronic communications, tracking those communications within a process, suggesting follow-ups to users and collaborators in response to communications from a process, suggesting team members to add as new collaborators to a process, etc. Furthermore, in one embodiment, the system 100 intelligently interprets the relationship management data, automatically culls contact information from the communications on a periodic or ongoing basis, deduplicates contact information, merges contact information obtained from different sources, combines relationship analysis results obtained from different communication channels, and users, generates process suggestions, follow-up suggestions, and team member collaboration suggestions, as well as performing other types of intelligent data analysis as discussed herein.

In one embodiment, users interact with the relationship management server 120 through a relationship management application 110. In one embodiment, relationship management application 110 is an application executed on a general purpose computing system, such as a desktop computer, a laptop computer, server computer, as well as other computing system. In one embodiment, the relationship management application 110 may also be executed on a mobile device, such as a smartphone, tablet, palmtop, as well as other mobile computing devices.

In one embodiment, relationship management application 110 initially receives a user request to register with relationship management server 120. Relationship management application 110 receives user registration data and indication of one or more digital identities associated with the user. The digital identities may include email addresses, social networking identities, telephone numbers, and other electronic communication identities, and their associated authentication credentials.

In one embodiment, relationship management server 120 receives the user registration data, specification of one or more digital identities, and corresponding authentication credentials, and then automatically and intelligently generates a relationship management system for the user. As will be discussed below, multiple users may be associated with a relationship management system. Furthermore, a relationship management system may be rapidly and newly created for a user, or created by another user to which the registering user is to be added as a team member/collaborator within a process.

In one embodiment, electronic communication aggregator 122 of relationship management server 120 utilizes the received user digital identities, and associated authentication credentials, to cull and ingest electronic communications from the various sources identified by the registering user. In one embodiment, electronic communication aggregator 122 accesses the electronic communication systems to obtain past electronic communications between the user and potential relationship management contacts. For example, electronic communication aggregator 122 utilizes an email address and password to access existing email messages on one or more email provider systems (not shown), such as the GMAIL™, EXCHANGE™, etc., to access existing electronic communications on social network system (not shown), such as FACEBOOK™, TWITTER™, LINKEDIN™, etc., to access voice over internet protocol (VOIP) system communication records, to access cellular telephone system records, to access video conferencing system records, as well as other existing electronic communications and/or records at the specified electronic messaging systems.

From the obtained electronic communications, as discussed in greater detail below, relationship analyzer 124 automatically identifies contacts associated with the user. In one embodiment, contact data can be identified from recipient data in outgoing email messages, social networking posts, VOIP calls, etc., sender data in incoming email messages, social networking posts, VOIP calls, etc. In one embodiment, the contact data may also be identified within the context of the electronic communication, such as within the text of a message, from specific portions of the text, such as an electronic communication signature extracted from the text, etc. As will be discussed in greater detail below, various pre-learned machine learning models, such as one or more natural language analysis, decision tree, neural network, support vector machines, conditional random fields, unsupervised learning (e.g. clustering), etc. techniques can be deployed by the relationship analyzer 124 to identify contacts, and data associated with the contact from, for example, the signature within the text of a communication.

In the embodiments discussed herein, relationship analyzer 124 interacts with relationship manager 126 to store a record of the automatically extracted contact information. In one embodiment, since data associated from a contact may be obtained from multiple sources, such as from two electronic communication types associated with a single user, different communications from two or more users, over different communication channels, etc., relationship analyzer 124 deduplicates contact information, obtained from different sources, into the same contact. Furthermore, the additional sources of potential contact information for a single contact enable relationship analyzer 124 and relationship manager 126 to refine contact details, update existing contacts with new contact data, add missing contact details, etc. For example, data extracted from a first user's communication might result in the contact John Doe with an email address of john@service1, and data extracted from a second user's communications may indicate that John R. Doe's phone number is 123-456-7890. In one embodiment, relationship analyzer 124, via the machine learning model analysis of the communications, such as inclusion of the same signature at the end of the text portions of different communications, may determine that John Doe and John R. Doe are the same person, and may merge the contact information and remove the duplicate contact entries. In one embodiment, as discussed in greater detail below, the merging of contact information may be performed automatically by relationship analyzer 124, or by relationship analyzer 124 generating a user suggestion to merge contact data. For example, relationship analyzer 124 may suggest to a user that John Doe and John R. Doe are the same person based on analyzing the names, without analyzing additional data from electronic communications. However, further analysis by relationship analyzer 124 on signatures within the electronic communications, text within the electronic communications, phone numbers located within the electronic communications, patterns of communications, as well as other factors, can also yield a match between John Doe and John R Doe. As will be discussed in greater detail below, a potential match made by relationship analyzer 124 may be accompanied by a confidence level of the match, such that when the confidence level exceeds a threshold, the contact information may be merged automatically by relationship analyzer 124.

In one embodiment, relationship analyzer 124 may additionally analyze the electronic communications obtained by electronic communications aggregator 122 to automatically determine a process associated with a user and one or more of the user's contacts. For example, if communications between a user and John Doe frequently user words indicative of a sale of a product, electronic communications aggregator 122 may automatically suggest a sales process be started, and that contacts (such as John Doe) be added as relationships within the process. In another embodiment, a registering, or existing user, may manually select a process, and the contacts to be added as relationships within the process, contacts to be added as collaborators, etc. In yet another embodiment, a combination of automated analysis and user selection can be employed to define a process, contacts that are to be relationships within the process, contacts that are to be added as collaborators with the process, and any customizations within the process (e.g., addition or deletion of one or more sequential stages in the process, data fields to be added to a process stage, specification of a communication and/or event that will cause a process to progress, etc.).

Relationship management application 110 may then be used by a user to interact with a relationship management system generated by the relationship management server 120. The relationship management server 120, in embodiments discussed herein, generates reports responsive to requests of the relationship management application 110, provides contact information lists, illustrates various processes associated with a user and the communications between relationships and collaborators within the process, and provides additional intelligence, such as latest communication, time since last communication, who contacted a relationship within a process, which team member should follow up with a relationship, etc.

In one embodiment, electronic communication aggregator 122 periodically queries the different electronic communications systems associated with each of the registered users in order to obtain the most recent electronic communications. In one embodiment, as these communications are obtained, relationship analyzer 124 performs ongoing analysis of those communications, sequences of communications, new communications, etc. in order to obtain new contact information, further refine existing contact information, filter communications to different stages in a process, update progress within a process, generate automatic suggestions from machine learning model analysis of the text of a communication (i.e., text includes "Employee should follow up with John Doe by next week . . . "), generate automatic suggestions from machine learning model analysis of a timing of the communications (i.e., an employee typically responds to John Doe's emails within two business days), etc. The updated information, process updates, automatic suggestions, etc. may then be presented to a user via the relationship management application 110.

Figure 2A:
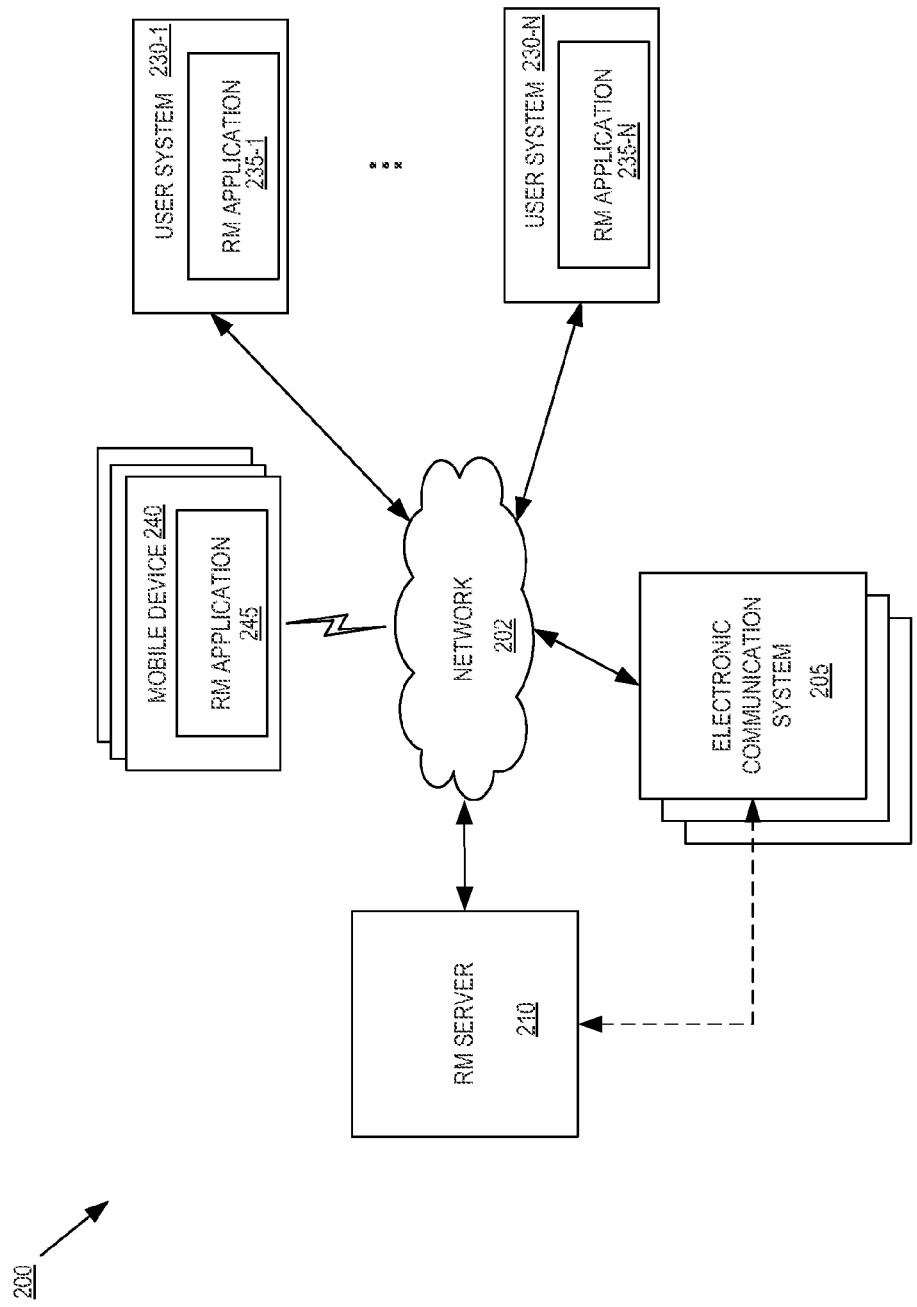
FIG. 2A is a block diagram of exemplary system architecture for providing a relationship management system in accordance with an embodiment of the invention.

FIG. 2A is a block diagram of exemplary system architecture for providing a relationship management system.

In one embodiment, the system 200 includes a plurality of user systems, such as user system 230-1 to user system 230-N, mobile devices 240, relationship management server 210, and a plurality of electronic communication systems 205. In one embodiment, user systems 230-1 to user system 230-N may each be a personal computing device, such as a desktop computer, laptop computer, tablet computer, etc. In one embodiment, each mobile device 240 may be a mobile computing device, such as a mobile telephone, personal digital assistant, tablet, etc. The relationship management server 210 and electronic communication system 205 may also be computing devices, such as server computers, desktop computers, etc.

The user systems 230-1 through 230-N, mobile device 240, relationship management server 210, and electronic communication system 205 may be coupled to a network 202 and communicate with one another using any of the standard protocols for the exchange of information. In one embodiment, mobile device 240 is coupled with network 202 via a wireless connection, such as a cellular telephone connection, wireless fidelity connection, etc.

In one embodiment, one or more of the user systems 230-1 through user system 230-N, mobile device 240, relationship management server 210, and the plurality of electronic communication systems 205 may run on one Local Area Network (LAN) and may be incorporated into the same physical or logical system, or different physical or logical systems. Alternatively, the user systems 230-1 through user system 230-N, mobile device 240, relationship management server 210, and the plurality of electronic communication systems 205 may reside on different LANs, wide area networks, cellular telephone networks, etc. that may be coupled together via the Internet but separated by firewalls, routers, and/or other network devices. In yet another configuration, the relationship management server 210 and one or more of the electronic communication systems 205 may reside on the same server, or different servers, coupled to other devices via a public network (e.g., the Internet) or a private network (e.g., LAN). It should be noted that various other network configurations can be used including, for example, hosted configurations, distributed configurations, centralized configurations, etc.

In one embodiment, the relationship management applications 235-1 through relationship management applications 235-N may be applications presented to a user via a web interface, stand-alone applications installed on user systems 230-1 through 230-N, or a combination of application types. Furthermore, remote application 245 may be a mobile application. In one embodiment, relationship management applications 235-1 through 235-N and relationship management application 245 are user applications that enable a user to register with relationship management server 210 for the automatic and intelligent creation of a relationship management system.

In one embodiment, a relationship management application, such as relationship management application 235-1 or 245, associated with a single user as indicated by the dashed line, transmits a registration request and registration data to relationship management server 210. The registration data may include a username and password that enables the user to access the relationship management server 210. In one embodiment, the registration data may further include usernames and authentication credentials that enable the user to access one or more electronic communication systems 205.

Relationship management server 210 receives the registration data and creates a relationship management account for the user, and associates the received usernames and authentication credentials with the newly provisioned relationship management account. In one embodiment, relationship management server 210 automatically obtains past electronic communications to and from the user by utilizing the received usernames and access credentials to access the specified electronic communication systems 205. For example, relationship management server 210 may access email systems, such as GMAIL™, EXCHANGE™, etc., social networking systems, such as FACEBOOK™, LINKEDIN™, etc., VOIP systems, teleconferencing systems, etc. Once authenticated into an electronic communication system 205, relationship management server 210 accesses the user's past electronic communications.

In one embodiment, relationship management server 210 utilizes the past communications to automatically and intelligently generate a relationship management system for the user. In one embodiment, relationship management server 210 analyzes each individual electronic communication, from the plurality of different communication channels, to extract contact data. In one embodiment, the contact data, corresponding to message sender or message recipient data, is extracted from message headers, message footers, message routing fields, as well as other fields of the electronic messages that contain potential contact information. In one embodiment, relationship management server 210 further analyzes the bodies of the accessed electronic communications utilizing one or more pre-trained machine learning model analysis techniques. In one embodiment, the machine learning model analysis techniques enable relationship management server 210 to extract useful contact information from within the text of a message, signature portions within the body of a message, as well as other portions of the messages identified by the machine learning model analysis that indicates relevant contact information. For example, relationship management server 210 may access two messages from an email system. The first email message is an outbound message with a header specifying the recipient as john@, and the first line in the body having the text "Dear John Doe." An inbound reply response message may specify in a header that the sender is john@service, and have a signature of "John R. Doe, CTO, ABC Corp." The machine learning techniques, as discussed herein, construct a communication graph from the communication(s), extract the contact details and metadata from the messages, fill in the communications graph with the extracted data, and through use of the corresponding email addresses merge the contacts in the communication graph to deduplicate the two contact entries to a single contact entry with the contact details from both messages. Although only two messages are discussed in the example, a communication graph can be constructed from a multitude of communications, from different communication channels, and even from different users. In one embodiment, relationship management server 210 utilizes machine learning model analysis of these communication graphs to extract, refine, and deduplicate automatically captured contact information.

In one embodiment, relationship management server 210 not only utilizes the accessed messages to determine contact information, relationship management server 210 may further analyze the accessed messages to determine a process for the user. As discussed above, a process is a combination of zero or more collaborators, zero or more relationships, and a group of sequential stages associated with sales, business development, recruiting, etc., in which certain communications/steps occur in the different stages. In one embodiment, relationship management server further analyzes the bodies of the electronic communications, utilizing machine learning models, to automatically suggest one or more processes for various communications. For example, when user communicates with organizational user 230-N and outside users (not shown) about a specific subject with words like "sale," "negotiable," "deal," etc., which may or may not be located within the same sentence, within a threshold number of words of one another, etc., a process may be automatically selected or suggested to a user. As part of the automatic process suggestion, one or more relationships may be determined or suggested in response to relationship management server's 210 determination that the user engages in a pattern of communication indicative of a specific topic (i.e., a specific sales of a product, recruitment of a specific candidate, fundraising activities with respect to a specific source, etc.). Furthermore, as part of the automatic process suggestion, one or more collaborators may be determined or suggested to the user when relationship management server 210 determines that one or more organizational users also engage in a similar pattern of communication indicative of the specific topic with the determined relationships (i.e., fellow employees that are also in communication with the outside users). In another embodiment, a user may manually specify one or more process details, such as collaborators and/or relationships, when providing registration details to relationship management server 210.

In one embodiment, after a user account is automatically populated with contact information, culled from a plurality of different communication systems 205, relationship manager 210 provides process and contact data to relationship applications 235-1 or 245. In one embodiment, the process and contact data is provided in response to a user request sent by one or more of relationship applications 235-1 or 245. In one embodiment, the process and contact data enables relationship applications 235-1 or 245 to display a user's culled contacts, a process, and progress within a process. In one embodiment, progress within a process, and the transition between stages in a process, is determined by user selection and specification of a current stage of a process.

In one embodiment, relationship management server 210 periodically accesses electronic communication systems 205 to check for new electronic communications. Relationship management server 210 analyzes the new communications individually, using the one or more pre-trained machine learning model analysis techniques, and in view of the corpus of previously analyzed communications. In one embodiment, the analysis may include updating a communications graph associated with the user, and determining whether to merge contacts, suggest relationships be added to a process, suggest collaborators be added to a process, advance stages of a process, etc.

As discussed above, a relationship management system is automatic and intelligently created for a user. The creation of the relationship management system is automatic, because the relationship management system can be populated with a user's contact information, a process selected for the user, and the communications periodically culled. The created relationship management system is generated in an intelligent manner since machine learning model based analysis determines, or at least aids in the determination of, refinement and deduplication of contact information, determines suggested contacts to add as relationships or collaborators to a process, and determines updates to relationships, collaborators, and progression with respect to a process.

FIG. 2B is a block diagram of one embodiment 250 of a relationship management application 252 and a relationship management server 260. Relationship management application 252 and a relationship management server 260 provide additional details for the relationship management applications and a relationship management server discussed above in FIGS. 1 and 2A.

In one embodiment, relationship management application 252 includes a relationship management communication interface 258, graphical user interface generator 256, and local data capture 254. Relationship management server 260 includes an application communication interface 262, electronic communication aggregator 264, relationship analyzer 266, one or more machine learning models 268, relationship management coordinator, and relationship management data store 280. In one embodiment, the relationship management application 252 and a relationship management server 260 communicate with each other over various networks and network configurations as discussed above in FIG. 2A.

In the relationship management application 252, graphical user interface generator 256 is responsible for generating an interface for a user for accessing the relationship management application. In embodiments discussed herein, the relationship management application 252 may generate the application interface as a web page, a standalone application, or a mobile application, based upon the type of computing system upon which the relationship management application 252 is executed. In one embodiment, relationship management application 252 receives a user request to register with relationship management server 260, and for the creation of a new relationship management system. In one embodiment, the request includes user specification of a username and password to be associated with the relationship management system, as well as login credentials for one or more electronic communication systems 205.

Relationship management communication interface 258 transmits the request, usernames, and authentication credentials to the application communication interface 262 of the relationship management server 260. In one embodiment, relationship management communication interface 258 and application communication interface 262 communicate with one another using standard communications protocols, such as HTTP, HTTPS, etc. Additionally, the data exchanged between relationship management communication interface 258 and application communication interface 262 may be exchanged as a single message, or a series of messages.

Application communication interface 262 provides the request, the user access credentials and the relationship management username/password combination to relationship management coordinator 270. Relationship management coordinator 270 provisions storage space within relationship management data store 280 for the new relationship management system to be created for the user.

Relationship management coordinator 270 further provides the user's authentication credentials for the various electronic communications systems to electronic communications aggregator 264. Electronic communications aggregator 264 utilizes the user's authentication credentials to access the electronic communication systems 205 via network 202 or locally (as indicated by dashed line). Initially, electronic communications aggregator 264 obtains all, or at least a portion, of the user's past communication activities on each of the electronic communication systems 205. These communications are provided to relationship analyzer 266 to apply one or more of machine learning models 268 to analyze the electronic communications. In one embodiment, the machine learning models are pre-trained machine learning methods, such as one or more natural language analysis, support vector machines, conditional random fields, unsupervised learning (e.g., clustering), etc. In one embodiment, relationship analyzer 266 applies the models 268 in order to extract contact information from the user's communication with other users (i.e., names, phone numbers, email addresses, job titles, affiliated companies, web sites, etc.).

Relationship analyzer 266 provides the results from the machine learning model analysis to relationship management coordinator 270 for storage in a contacts/relationships database 286 in relationship management data store 280. In one embodiment, when electronic communication aggregator 264 passes the obtained electronic communications to relationship analyzer 266, the electronic communications are also passes to relationship management coordinator 270 for storage in a database 282 in relationship management data store 280.

In one embodiment, relationship analyzer 266 further determines one or more processes to associate with the user based on the user's communications. As discussed herein, the communications may indicate the user engaging in a sales process with a first group of users, engaging in a recruiting process with a second group of users, etc. The relationship management coordinator 270 stores these determined processes, and the additional user contacts associated with these processes in database 284 and 286. As discussed herein, the users and contacts that are added to a process may be one or more relationships in a process from outside of an organization, or one or more collaborators in a process from within an organization. Although databases 282, 284, 286, and 288 are illustrated as separate databases in data store 280, consistent with the discussion herein, the databases may be combined into a single database or a combination of databases in relationship management data store 280.

In one embodiment, electronic communication aggregator 264 periodically queries electronic communication systems 205 for new electronic communications sent to, or from, the user of relationship management application 252. In one embodiment, relationship management application 252 supplements the data gathered by electronic communication aggregator 264 by utilizing local data capture 254. In one embodiment, local data capture 254 records communication data, such as telephone call data, video conference data, chat data, etc. that is initiated within relationship management application 252, or that is initiated on a device that is executing relationship management application 252. The electronic communication data gathered by local data capture 254 is transmitted via interfaces 258 and 262 to electronic communication aggregator 264.

As electronic communication aggregator 264 periodically obtains new communications, the new communications are provided to relationship analyzer 266. Relationship analyzer 266 analyzes the new communications with one or more of the pre-trained machine learning models 268. Furthermore, relationship analyzer 266 analyzes the new communications in view of the prior communications stored in relationship management data store 280. In one embodiment, relationship analyzer 266 loads the previously obtained messages from electronic messages and metadata 282.

In another embodiment, instead of retaining each communication, relationship analyzer 266 constructs a message graph for all obtained electronic communications. The message graph stores the user as a central vertex in the graph, other users that are recipients/senders of communications are stored nodes connected to the vertex, and communications between the user and the relationship/contacts are stored as paths between the central vertex and other nodes. Furthermore, each node include metadata extracted from the communications such as time of delivery, time of receipt, domain name in email addresses extracted from message, machine learning model analysis results of message body, average reply time, last reply time, etc. This message graph can then be stored in relationship management data store 280 and supplemented by relationship analyzer 266 upon receipt of new messages associated with the user. For example, an email may be obtained from John Doe (john@service) and a second communication may be obtained from a social networking system for John R. Doe (123-456-7890) and stored as different nodes within a graph for a user, with the email address, phone number, and social networking handle stored as metadata associated with their respective nodes. As discussed herein, analysis of the names may be sufficient for relationship analyzer 266 to generate a user suggestion to merge the contact information (email address, phone number, social networking handle, etc.) for John Doe and John R. Doe, thereby merging the nodes in the communication graph and integrating the metadata. Further analysis by relationship analyzer 266, such as analysis of the content of John Doe's email signature and John R. Doe's social network post signature that determines both signatures include text indicating John Doe and John R. Doe are CEO of Acme Inc., the confidence that the identities associated with the contact information obtained from the different sources are the same, may exceed a threshold, and thus can be automatically merged/deduplicated into a single contact (e.g., node within the communication graph) with the data extracted from the multiple disparate sources (e.g., merging of metadata from multiple nodes).

Furthermore, in one embodiment, the message graph can be refined by relationship analyzer 266 in response to the analysis of new electronic communications. For example, relationship analyzer 266 can determine, from machine learning model analysis, that two nodes should be merged. In one embodiment, relationship analyzer 266 automatically merges the nodes, and thus merges contact data culled from different sources of electronic communications, when a degree of certainty that the two nodes correspond to the same contact exceeds a high confidence threshold. In one embodiment, relationship analyzer 266 automatically generates a suggestion that queries the user to confirm a merging of the contact information, when a degree of certainty that the two nodes correspond to the same contact exceeds a low confidence threshold but does not exceed the high confidence threshold. In one embodiment, relationship analyzer 266 does not merge contacts or automatically generate a suggestion when a degree of certainty that the two nodes correspond to the same contact does not exceed the low confidence threshold. In one embodiment, the automatically generated suggestions are stored in an insights and suggestions database 288.

In one embodiment, relationship analyzer 266 further filters communications, based on the machine learning model analysis 268 to an associated process. For example, from natural language analysis of an email message, relationship analyzer 266 determines a degree of certainty that the message belongs to a specific process. Based on the thresholds discussed above, relationship analyzer 266 can automatically filter the communication to the process, automatically generate a suggested process and/or stage for the communication, or do nothing. As discussed above, the automatically generated suggestions, if any, are stored in the insights and suggestions database 288.

In one embodiment, contact, process, relationship, collaborator, and communication data is provided to relationship management application 258 in response to a user request received via the graphical user interface generator 256. Relationship management interface 258 communicates the request to application communication interface 262, relationship management coordinator 270 accesses the requested data from the relationship management data store 280, and provides the requested data to the relationship management application 252. In one embodiment, even if not requested by a user, when a suggestion is stored in insights and suggestions database 288, relationship management coordinator 270 provides the suggestions/insights for display to, and disposition by, a user.

In the embodiments discussed herein, the data displayed by graphical user interface generator 256 can be configured for display based on characteristics of a device, such as screen size, resolution, dimensions, etc. Furthermore, the display may graphically illustrate a process, communications within the process, and a filtered result of the communications (e.g., display indicating an appropriate stage within a process).

In one embodiment, processes may be multi-user processes within an organization. In this embodiment, contacts, relationships, messages, suggestions, etc. may be accessible to other participants in a process (i.e., other sales people in an organization, specific users participating in a recruitment process, etc.). In one embodiment, relationship analyzer 266 may further refine or add to contact details by leveraging contact data extracted from several users and several different communication services. Similarly, suggestions may be culled from one user's communications within a process, and the suggestion propagated to additional users. For example, User1 in a collaboration initially has separate contact information in an electronic address book corresponding to John Doe (john@) and John R. Doe (123-456-7890). Collaborator User2 knows John R. Doe from a social networking service, and has contact information indicating that John R. Doe works at Acme Inc. If User1 receives as email from john@ with a signature stating he works for Acme Inc., then User2's information that John R. Doe also works at Acme can be used to automatically merge the two contacts in User1's address book, without transferring explicitly the information from User2 to User1. Alternatively, a user suggestion may be generated to query a user whether the two contacts (John Doe and John R. Doe) should be merged in the User1's address book.

In the embodiments discussed herein, in response to a user supplying access credentials for different communication systems, a relationship management system can be automatically, intelligently, and efficiently created for the user. In one embodiment, creation is enabled by extracting contact information from the electronic communications, selecting one or more relationship management processes for the user, and continually refining the contact information and progress through the processes from analysis of the communications.

Figure 3:
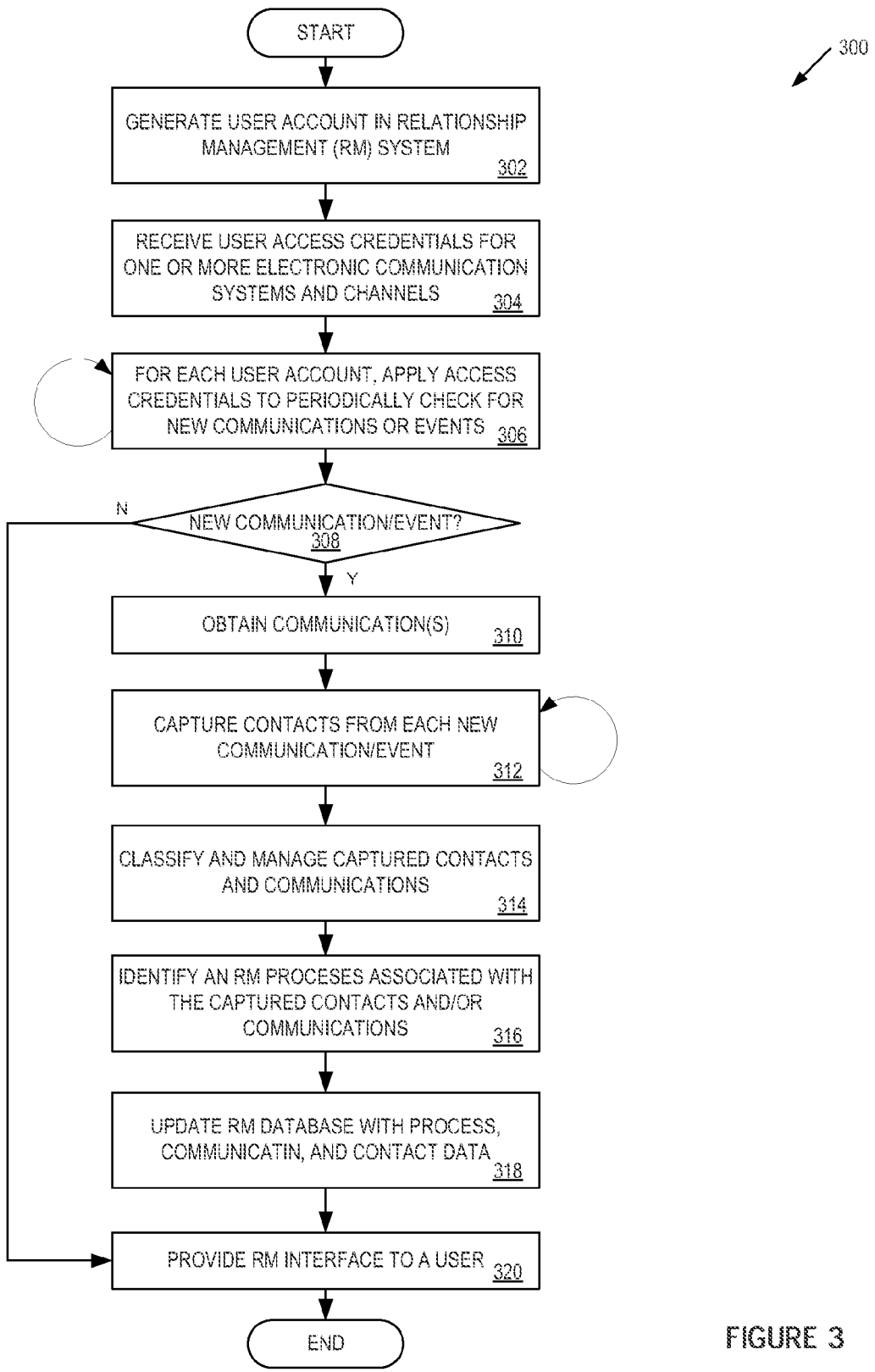
FIG. 3 is a flow diagram of one embodiment of a method for the automatic creation of a relationship management system for a user.

FIG. 3 is a flow diagram of one embodiment of a method 300 for the automatic creation of a relationship management system for a user. The method 300 is performed by processing logic that may comprise hardware (circuitry, dedicated logic, etc.), software (such as is run on a general purpose computer system or a dedicated machine), firmware, or a combination. In one embodiment, the method 300 is performed by a relationship management server, such as relationship management server 120, 210, or 260.

Referring to FIG. 3, processing logic begins by generating a user account on a relationship management server (processing block 302). In one embodiment, the user account is generated in response to a user request. In another embodiment, the account is generated for one or more users in response to a request of an administrator. In one embodiment, the account may be a request for a new relationship management system. In another embodiment, the request may be a request for an account to join an existing relationship management system, in which one or more processes are already selected in the existing relationship management system.

Processing logic receives user access credentials for one or more electronic communication systems (processing block 304). In one embodiment, the user access credentials include usernames, passwords, biometric data, encryption keys, etc. that enable the user to access the corresponding electronic communication systems. Furthermore, the electronic communications systems may be for a plurality of different communication types over different communication channels. For example, the communication systems may include social networking systems, web based email systems, exchange based email systems, blogging systems, microblogging systems, multimedia blogging systems, VOIP systems, multimedia teleconferencing systems, calendar systems, and the like. In one embodiment, these communication systems support electronic communication over different channels, such as text, video, audio, or a combination of channels, and intelligence may be extracted from each of these communications by a relationship management system, as discussed herein.

Processing logic applies the received user access credentials to periodically check for new communications and events for each of the communication systems supplied by the user during registration (processing block 306). Processing logic periodically applies the usernames, passwords, keys, biometrics, etc. to access the electronic communications in order to obtain the users latest communication. In one embodiment, when a user first registers with a relationship management server, processing logic obtains a set of the users communications, such as all communications occurring within the last week, month, year, etc. In another embodiment, when a user first registers with a relationship management server, processing logic obtains all communications from the corresponding electronic communication systems. In addition to accessing electronic communications at the various specified systems, in one embodiment, processing logic also accesses any address books, calendar events, to-do notes, etc. maintained at the electronic communication systems.

When there are no new electronic communication events, processing logic provides a relationship management interface to the user (processing block 308 and 320). In the relationship management interface, the user is presented with access to automatically culled contact information, which has been obtained, deduplicated, and merged from the plurality of different communication systems associated with the user or other users. Furthermore, as discussed herein, the user is enabled to view one or more processes (e.g., a sequential list of stages related to sales, recruiting, business development, etc., in which communications are exchanged between relationship and collaborators) associated with the user, and the progress within each process.

However, when there are new electronic communications (processing block 308), such as when a user first registers with the relationship management system or communications have occurred since the last processing logic query, processing logic obtains the communication(s) (processing block 310). From the obtained communication processing logic captures contact data from each communication or event (processing block 312). For example, the contact details in 'to,' 'from,' 'CC,' etc. fields in an electronic communication can be extracted from each communication and associated with a record of the communication. As another example, invitees in a calendar event can be extracted from the event.

Processing logic then classifies and manages the captured contacts and communications (processing block 314). As discussed in greater detail below, each communication and/or contact can be analyzed to determine if the contact is legitimate (i.e., from a person or organization) or illegitimate (i.e., a robot or spam generated contact/communication). Furthermore, the body or text of an electronic communication can be analyzed by one or more machine learning model analysis techniques to extract contact details from the message contents, determine an importance of the communication or contact to user, determine one or more actions to be performed by the user or other users in response to the communication, etc.

In one embodiment, processing logic further identifies one or more relationship management processes associated with the user and the captured contacts/communication (processing block 316). In one embodiment, the process(es) are identified as user selected processes, such as new processes created by the user or existing processes that the user is joining. In another embodiment, one or more machine learning model analysis techniques are applied to the captured electronic communications, and one or more processes are automatically selected based on a context of the electronic communications, relationships added and/or suggested for addition to the selected processes, and collaborators added and/or suggested for addition to the selected processes.

The process, communication, and contact data is then added to one or more relationship management databases (processing block 318), and a user is provided with a relationship management interface (processing block 320), as discussed herein.

Figure 4:
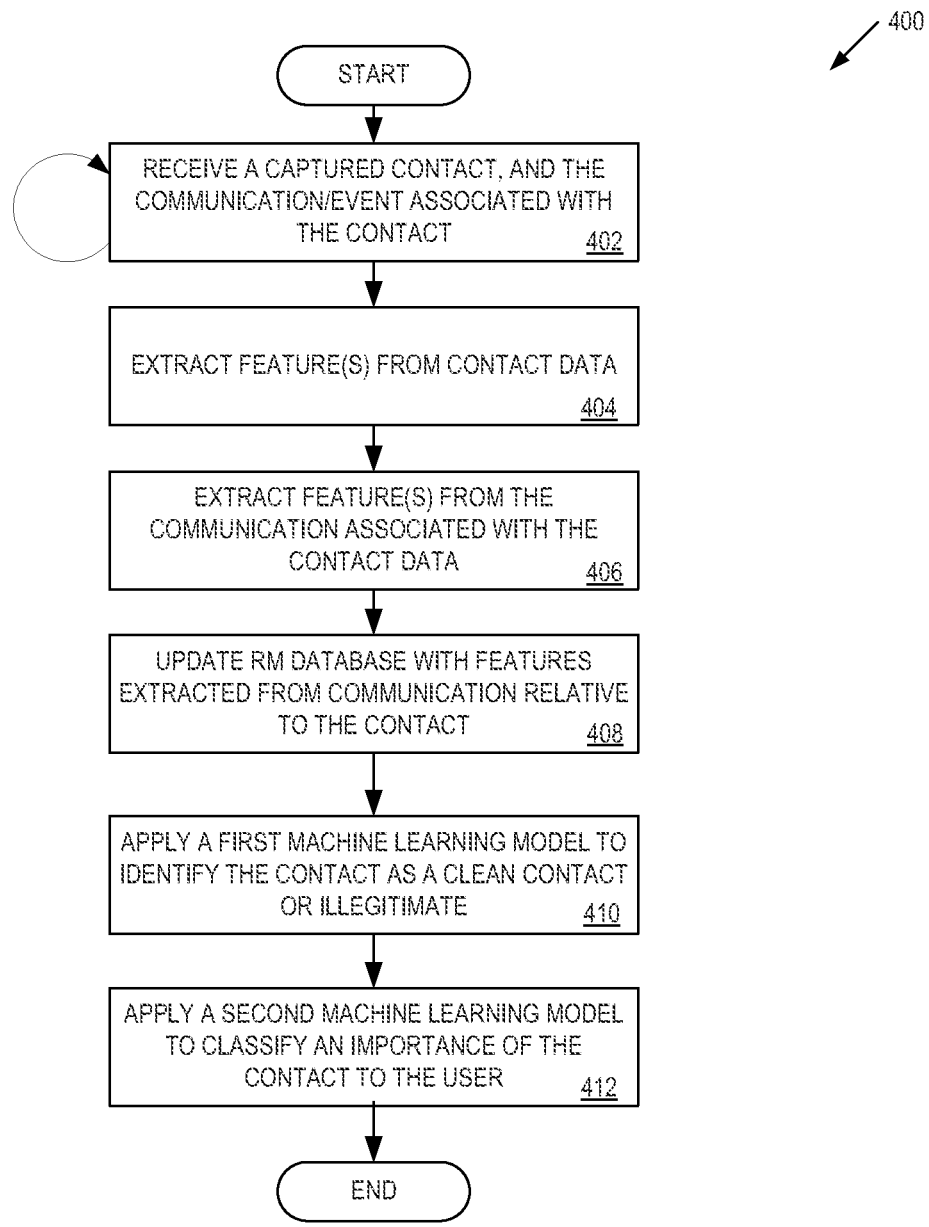
FIG. 4 is a flow diagram of one embodiment of a method for contact extraction for a relationship management system.

FIG. 4 is a flow diagram of one embodiment of a method 400 for contact extraction for a relationship management system. The method 400 is performed by processing logic that may comprise hardware (circuitry, dedicated logic, etc.), software (such as is run on a general purpose computer system or a dedicated machine), firmware, or a combination. In one embodiment, the method 400 is performed by a relationship management server, such as relationship management server 120, 210, or 260, and provides additional details for the classification and management of contacts/communications discussed above.

Referring to FIG. 4, processing logic begins by receiving a captured contact, and the communication or event associated with the captured contact (processing block 402). In one embodiment, in response to the periodic querying of electronic communication systems, as discussed in FIG. 3, processing logic continually receives captured contact data and communications.

Processing logic extracts one more features from the contact data (processing block 404). In one embodiment, processing logic extracts the name of a message sender or recipient, length of name, email or other address, syntactic match between name and email address, presence of random numbers in email address, etc. Processing logic further extracts one or more features from the communication associated with the contact data (processing block 406). In one embodiment, the features extracted from the communication include number of emails exchanged between user and the contact, directionality of the email (i.e., are the messages always in one direction, or do the messages flow in both directions), fraction of times the user is CC'ed along with a large number of recipients, etc. Processing logic then updates one or more relationship management databases with the extracted feature data (processing block 408).

Based on the features extracted from the contact data, as well as from the features extracted from the associated communication, processing logic applies a first set of one or more machine learning model(s) to identify the contact as a clean contact or a robot (processing block 410). In one embodiment, the machine learning models analyze the factors, such as frequency of contact, syntactic similarity between contact and email address, whether communications are primarily or always in one direction, etc. to determine if the potential contact is a legitimate contact. Based on the extracted features and the pattern of communication, the machine learning model(s) can determine whether the contact is legitimate (i.e., a real contact for which the user is engaged in communication) or illegitimate (i.e., a potentially malicious contact, such as a spam contact, fishing contact, malware contact, etc.).

Processing logic then applies a second machine learning model(s) to classify an importance of the contact to the user (processing block 412). In one embodiment, the contact can be classified as important based upon the machine learning model(s) analysis of the frequency of communications, a length of time between receipt of a communication from the contact and a reply by the user, length of the body of the contact, context of the content of the messages, etc. The determined importance of a contact can then be used in various applications, such as deciding whether a user would like to follow up with a contact, ranking the contact when a user performs a search for contacts, adjusting a probability of a match when there is a determined partial match, etc.

Figure 5:
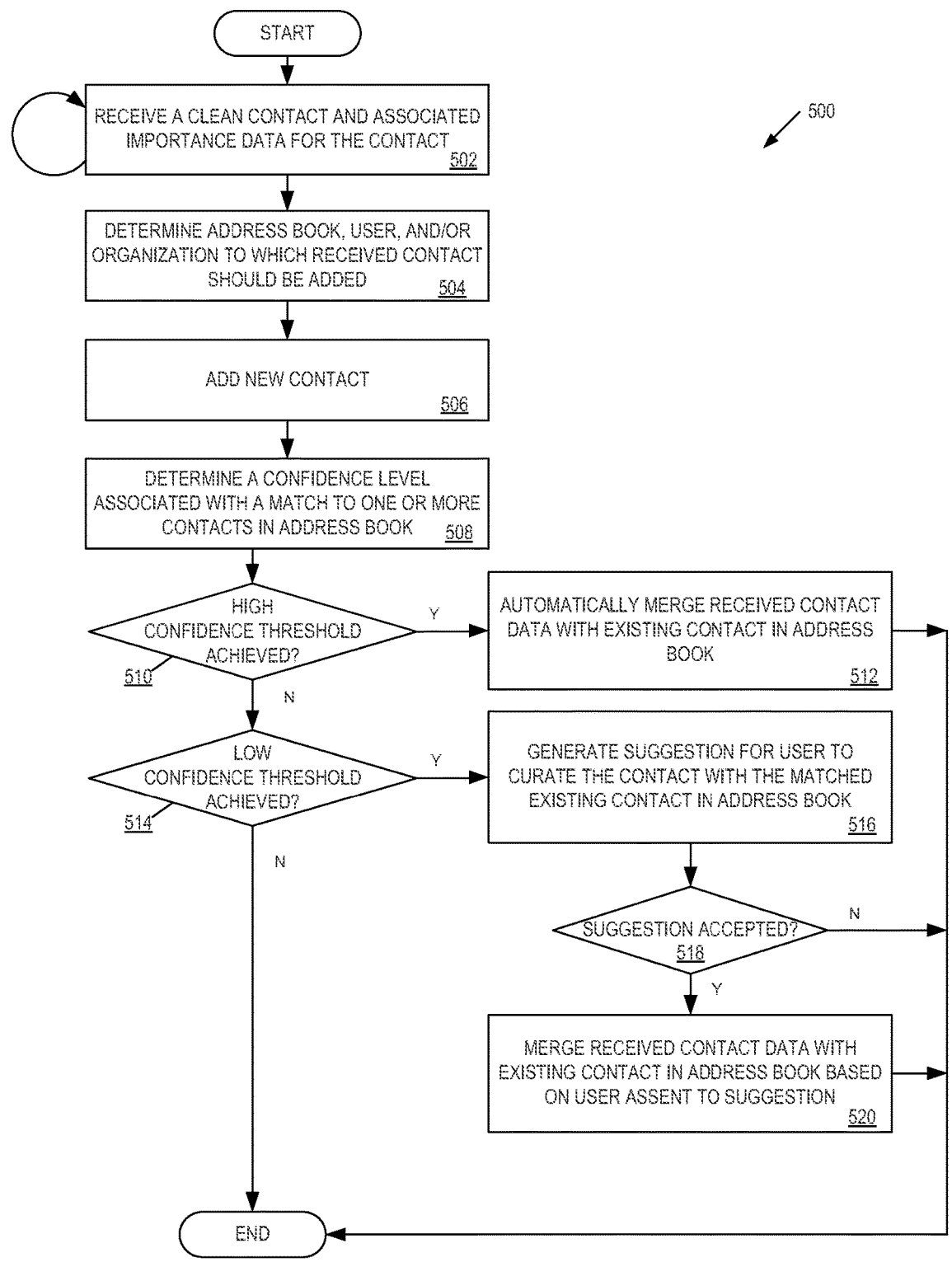
FIG. 5 is a flow diagram of one embodiment of a method for automatic management of extracted contacts.

FIG. 5 is a flow diagram of one embodiment of a method 500 for automatic management of extracted contacts. The method 500 is performed by processing logic that may comprise hardware (circuitry, dedicated logic, etc.), software (such as is run on a general purpose computer system or a dedicated machine), firmware, or a combination. In one embodiment, the method 500 is performed by a relationship management server, such as relationship management server 120, 210, or 260.

Referring to FIG. 5, processing logic begins by receiving clean contact data and associated importance data for the contact (processing block 502). In one embodiment, the contact data and importance data are received from the processing logic discussed above in FIG. 4.

Processing logic determines a user's address book, an organization's address book, and/or a contact within a relationship management process to which the received contact should be added (processing block 504). In one embodiment, contact data may be determined to be relevant to one or more of a user, an organization, a relationship, and a process. The relevance can be determined from the features extracted in FIG. 4, as well as from application of one or more machine learning models to the contact and/or communication content associated with the contact. In another embodiment, a user may specify the relevance of an extracted contact to the user, an organization, a relationship, and/or a process. As discussed in greater detail below, processing logic automatically manages how the contact is added to one or more of the user, organization, and process address books. Processing logic then creates a new contact (processing block 506), as determined at processing block 504. In one embodiment, processing logic stores the new contact in relationship management data store 280.

Processing logic then determines a confidence level associated with a match to one or more contacts in the address book (processing block 508). In one embodiment, processing logic determines the confidence level of the potential match based on analysis of a plurality of factors associated with the received contact data and the potentially matching contact data. For example, processing logic may apply one or more machine learning model analysis techniques, such as natural language analysis, similarity learning models, decision tree analysis, etc., to compare and/or analyze the factors such as closeness of a match between first name of contact, last name of contact, matching communication addresses or company names, similarity between names and email addresses, similar frequency of communication, similar length of communication, similar communication signatures, same or similar domains associated with the contact, pattern of the user's replies to the communication, etc.

The received contact data is then automatically merged with an existing contact in one or more address books when processing logic determines the confidence level associated with an extracted contact detail is high (processing blocks 510 and 512). For example, the confidence level may be a normalized and combined score of the results of each analyzed feature. The confidence level may also be a cumulative score of the results of each analyzed feature. In one embodiment, the confidence level is compared to a threshold configured to reflect a high degree of certainty that the received contact data and the existing contact are the same contact.

However, when processing logic determines that the confidence level is below the high confidence threshold, but at or above a low confidence threshold, processing logic generates an automatic suggestion for the user to curate a contact detail (processing blocks 514 and 516). In one embodiment, when any potential match is found, but the confidence of the match does not exceed the high confidence level threshold, processing logic generates an automatic suggestion for the user to add the contact to an address book entry. The suggestion may or may not be followed by the user. However, when the suggestion is determined from the machine learning model analysis, the suggested match is often likely to be accepted by the user. Processing logic may then receive an acceptance by the user of the generated suggestion (processing block 518), and merge the received contact detail with the existing contact data (processing block 520).

If the user does not accept the generated suggestion (processing block 518) or the confidence level associated with a match between the received contact data and existing contact data does not meet or exceed the low confidence threshold (processing block 514), the new contact is maintained in the relationship management data store 280 and not merged with any existing contact data.

Figure 6:
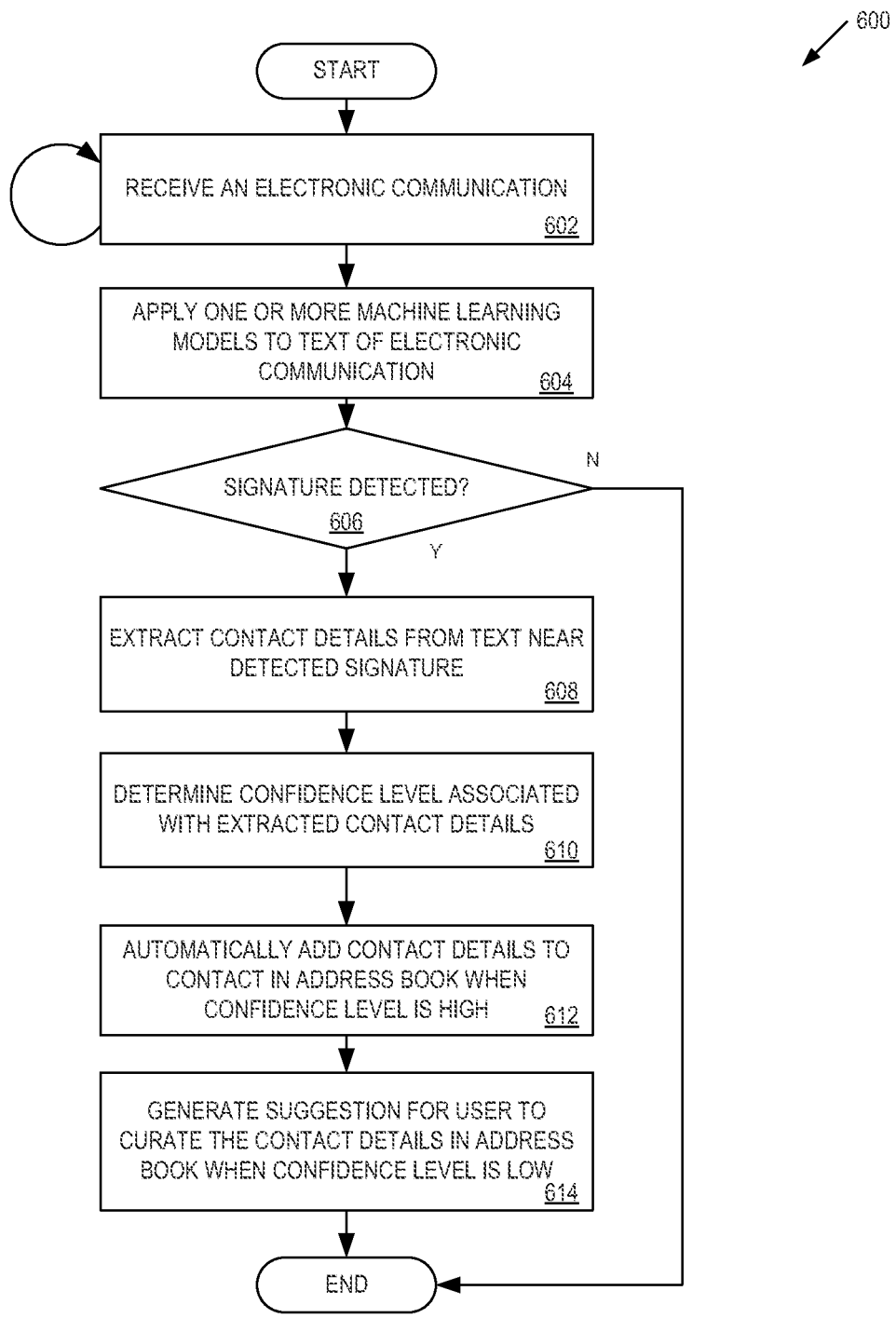
FIG. 6 is a flow diagram of one embodiment of a method for signature extraction and contact information integration.

FIG. 6 is a flow diagram of one embodiment of a method 600 for signature extraction and contact information integration. The method 600 is performed by processing logic that may comprise hardware (circuitry, dedicated logic, etc.), software (such as is run on a general purpose computer system or a dedicated machine), firmware, or a combination. In one embodiment, the method 600 is performed by a relationship management server, such as relationship management server 120, 210, or 260.

Referring to FIG. 6, processing logic begins by receiving an electronic communication (processing block 602). In one embodiment, the electronic communication is a text-based communication obtained by the processing logic discussed in FIG. 3. In one embodiment, processing logic applies one or more machine learning model analysis techniques to the text of the electronic communication (processing block 604) to determine whether a signature is detected within the body of the communication (processing block 606). In one embodiment, machine learning model analysis techniques, such as natural language analysis, analyze the content, format, and placement of content within the electronic communication in order to locate a message signature. As discussed in FIG. 6, the message signature portion of an electronic communication is the portion within the content of the communication in which the author lists one or more of their name, company, position, title, phone number(s), address, fax number(s), etc. In one embodiment, the machine learning model analysis attempts to locate the signature according to typical signature placement patters, signature layouts, proximity of words (e.g., proximity of a title, company, address, etc. to a name), etc.

When no signature is detected (processing block 606), the process ends. However, when the results of the machine learning model analysis identifies a signature (processing block 606), processing logic extracts contact details from the text near the signature (processing block 608). In one embodiment, the text extracted near the detected signature is the text identified at processing block 604 that enabled the signature to be detected. For example, the name, title, phone and fax number, email address, website, corporation name, etc.

Similar to the discussion above, processing logic determines a confidence level associated with the contact details extracted from the electronic communication during the machine learning model analysis (processing block 610). In one embodiment, the confidence level relates to the machine learning model analysis results, and whether the specifics of a contact detail can be identified (i.e., a contact detail is likely to be the contact's email address, title, company, etc.). The contact details are added to the contact in one or more address books when the confidence level associated with an extracted contact detail is high (processing block 612), and an automatic suggestion for the user to curate a contact detail is generated when the confidence level associated with an extracted contact detail is low (processing block 614). In one embodiment, where one or more contact details are extracted from a single communication, each contact detail may be associated with its own confidence level, and individually selected for automatic insertion into an address book or subject to user confirmation. In another embodiment, where one or more contact details are above the high confidence level threshold, all contact details may be added to an address book. However, when one more contact details satisfy the low confidence level threshold, all contact details may be subject to user confirmation prior to entry in an address book.

Figure 7A:
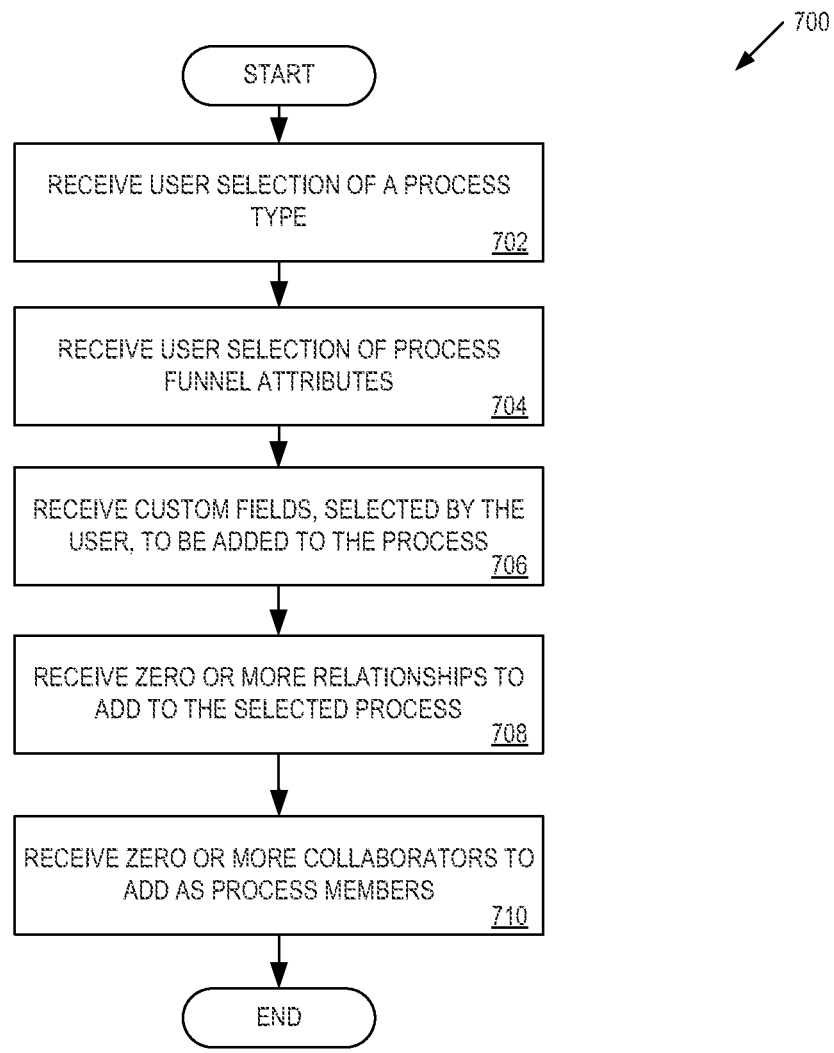
FIG. 7A is a flow diagram of one embodiment of a method for user definition of a relationship management process.

FIG. 7A is a flow diagram of one embodiment of a method 700 for user definition of a relationship management process. The method 700 is performed by processing logic that may comprise hardware (circuitry, dedicated logic, etc.), software (such as is run on a general purpose computer system or a dedicated machine), firmware, or a combination. In one embodiment, the method 700 is performed by a relationship management server, such as relationship management server 120, 210, or 260, and provides additional details for processing block 316 of FIG. 3.

Referring to FIG. 7A, processing logic begins by user selection of a process type (processing block 702). As discussed above processes are a series of sequential stages of communications between relationships and collaborators. Different processes and the sequence of stages within the process may include, for example, a sales process (e.g., first contact, product demo, price quote, offer, close), a business development process (e.g., growth identification, partner identification, project assignment, growth tracking), a recruiting process (e.g., candidate contact, resume obtained, initial interview, follow-up interview, offer or decline), a fund raising process (e.g., contact, presentation, analysis, funding decision), as well as other processes which are, or can, be carried out with electronic communications.

Processing logic then receives user selection of process funnel attributes (processing block 704). In one embedment, processing logic receives user selection of the statuses that will populate the various stages (i.e., the funnel) of the process, such as whether the process is new, completed, in progress, what stage a process is currently in, how a stage is completed, etc. Furthermore, processing logic receives user selection of actions to take upon completion of a stage within a process, such as one or more of generation of a contact, generation of a notification to an individual or a group of users, generation of a calendar event, etc.

Processing logic further receives user selection of custom fields to be added to the process (processing block processing block 706). In one embodiment, the fields may be data to be collected during a stage in a process, communication attributes for communications relevant to the stage in a process, number of days since last contact, days in the current status, etc.

Processing logic then receives zero or more relationships to add to the selected process (processing block 708) and zero or more collaborators to add as process members (processing block 710). In one embodiment, user specification of relationships indicate particular users external to an organization that are relevant to a process or stages within the process, and user specification of collaborators indicate particular users internal to an organization that are relevant to the process or stages within the process. For example, in a sales process, relationships might include a potential client, marketing personnel from the potential client, the CEO of the potential client, etc. Furthermore, the collaborators in the process may include the user, and the user's coworkers that are engaged in communication with the various relationships.

Figure 7B:
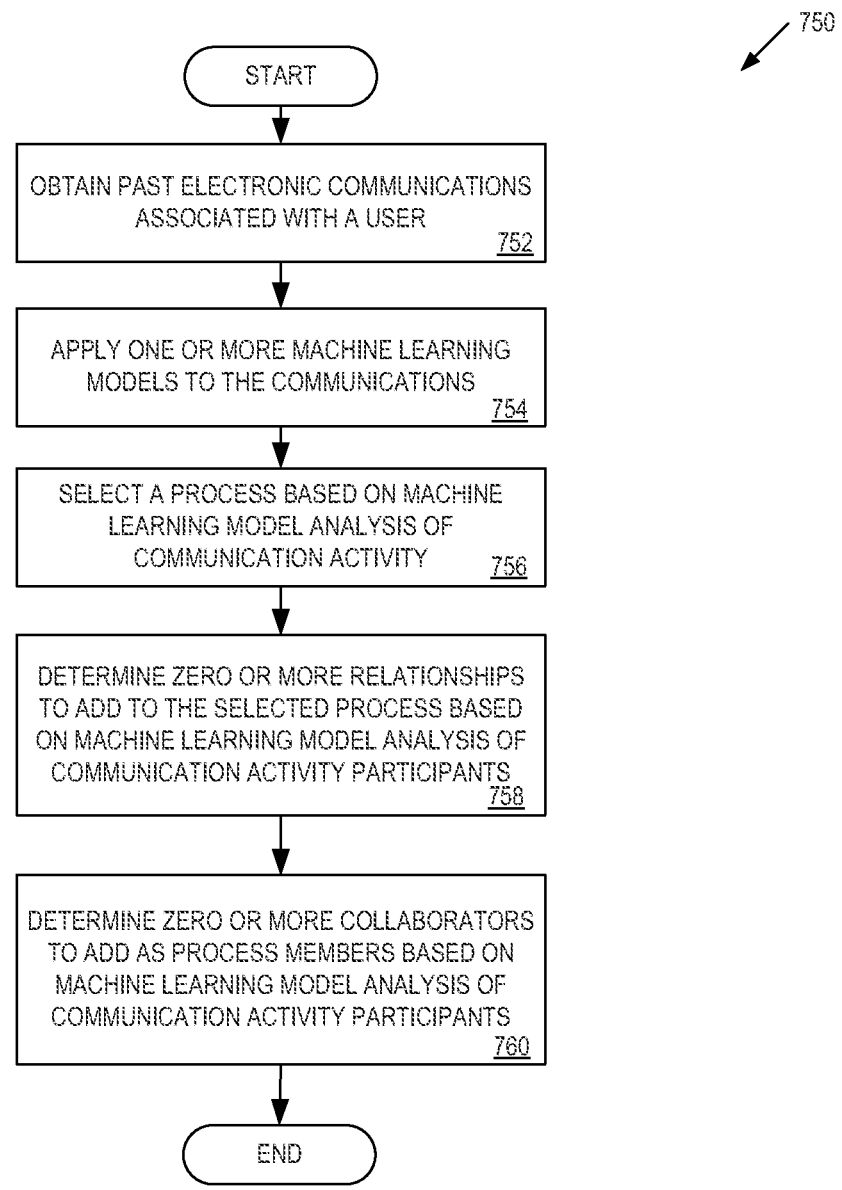
FIG. 7B is a flow diagram of one embodiment of a method for automatic definition of a relationship management process based on electronic communications.

FIG. 7B is a flow diagram of one embodiment of a method for automatic definition of a relationship management process based on electronic communications. The method 750 is performed by processing logic that may comprise hardware (circuitry, dedicated logic, etc.), software (such as is run on a general purpose computer system or a dedicated machine), firmware, or a combination. In one embodiment, the method 750 is performed by a relationship management server, such as relationship management server 120, 210, or 260, and provides additional details for processing block 316 of FIG. 3. Furthermore, method 750 may be performed as an alternative to method 700 discussed above. Alternatively, method 750 may be performed in order to supplement the process discussed in method 700.

Referring to FIG. 7B, processing logic begins by obtaining past electronic communication associated with a user (processing block 752). In one embodiment, past electronic communication activity, which may be obtained from various registered electronic communication systems associated with a user and user access credentials, are obtained. Processing logic applies one or more machine learning model analysis techniques to the obtained communications (processing block 754). In one embodiment, processing logic applies pre-learned natural language analysis to recognize words, word patters, proximity of words, etc. indicative of one or more potential processes (processing block 756).

Based on the machine learning analysis, processing logic further determines zero or more relationships to add to the selected process (processing block 758) and zero or more collaborators to add as process members (processing block 760). In one embodiment, the machine learning analysis applied by processing logic, for purposes of addition of process relationships and process members, involves analyzing communication activity between potential process participants. For example, when communications are exchanged which are relevant to a process, and are exchanged between users from the same organization, processing logic may determine that these users should be added as process members/collaborators. When similar communications are exchanged between organizational and non-organizational members (i.e., as indicated by electronic communication addresses with different domains, different addressing fields within the same domain, etc.), the non-organizational members may be determined to be potential process relationships. For example, communications between two organizational users and three outside users that include words such as offer, sale, demo, support, etc., which are located in proximity to one another, and satisfy other natural language analysis patterns, may indicate that the two organization users and the three outside users are engaged in a sales process, the three outside users should be added as relationships to the sales process, and the user creating the process should add the other organizational user as a process collaborator.

As discussed above, the automatic or user specification of a process, process members, and relationships aids in the automatic filtering of communications that are relevant to the process and exchanged in furtherance of the process.

Figure 8:
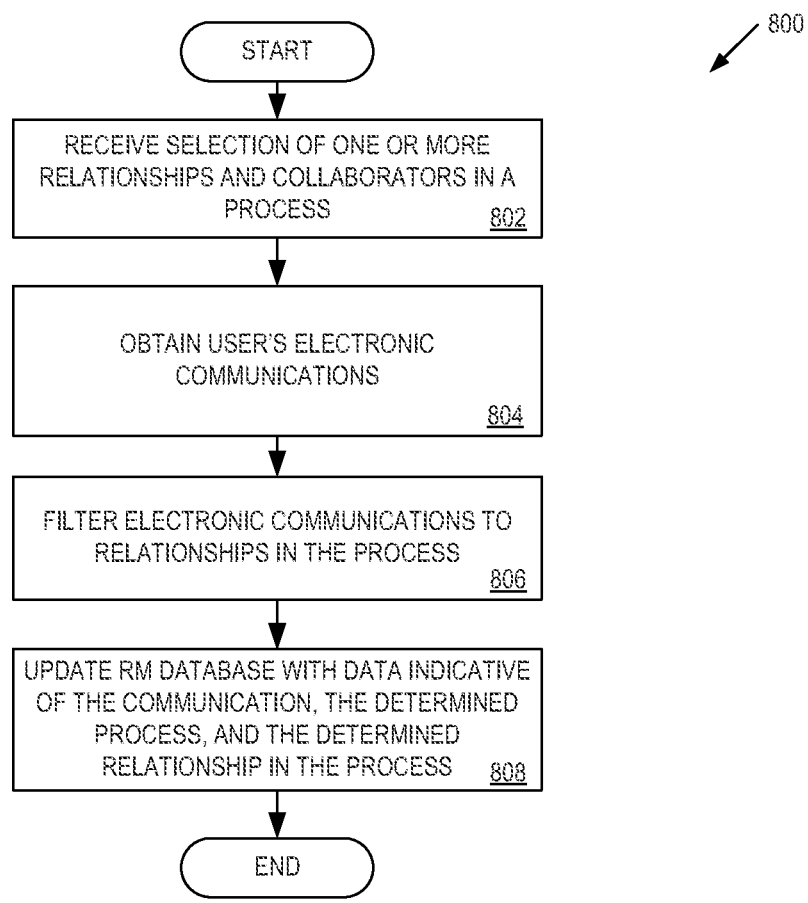
FIG. 8 is a flow diagram of one embodiment of a method for process based electronic communication filtering in a relationship management system.

FIG. 8 is a flow diagram of one embodiment of a method 800 for process based electronic communication filtering in a relationship management system. The method 800 is performed by processing logic that may comprise hardware (circuitry, dedicated logic, etc.), software (such as is run on a general purpose computer system or a dedicated machine), firmware, or a combination. In one embodiment, the method 800 is performed by a relationship management server, such as relationship management server 120, 210, or 260, and provides additional details for processing block 316 of FIG. 3.

Referring to FIG. 8, processing logic begins by receiving one or more relationships and collaborators in a process (processing block 802). In one embodiment, the addition of collaborators or relationships to a process may be received as a user selection, as discussed above in FIG. 7A. In one embodiment, the addition of collaborators or relationships to a process may be received as automatically selected relationships and process members, as discussed in FIG. 7B. Furthermore, a combination of manually selected and automatically selected relationships/process members may be added by processing logic to a process.

Processing logic obtains a user's electronic communications (processing block 804). In one embodiment, the communications are periodically obtained by processing logic, as discussed above in processing block 306 of FIG. 3. The obtained communications are then filtered to relationships within a process (processing block 806). In one embodiment, processing logic analyzes a sender and recipient address of an electronic communication to determine whether either address is for a contact/relationship within a process. In one embodiment, processing logic may additionally analyze the body of an electronic communication for mentions of a process member or relationship in the electronic communication. Furthermore, in one embodiment, processing logic may apply one or more machine learning model analysis techniques to determine which process and associated relationships a communication may belong to. Processing logic analyzes the address information, analyzes the communication body, and/or performs one or more machine learning model analysis techniques in order to determine a likelihood of a match to a relationship (new or existing) to which the communication can be filtered. Furthermore, processing logic can perform the analysis based on the communication's contents, based on existing relationships, based on a series of communications within a relationship, etc. Matches can then be automatically filtered to a potentially matched relationship by processing logic when the likelihood of a match to the relationship exceeds a high confidence threshold, a suggestion can be generated for a user to consent to a match when the likelihood of the match to the relationship exceeds a low confidence threshold, and the communication can be ignored, deleted, or otherwise disposed of when the likelihood of a match to the relationship fails to exceed the low confidence threshold.

Based on the filtering results, a relationship management database is updated with data indicative of the communication, the determined process to which the communication should be added, and the determined relationship in the process (processing block 808).

In one embodiment, the automatic filtering of communications to a process enables progress within a process to be tracked, and displayed to a user. Furthermore, such events are captured periodically, in near real time, to ensure that a relationship management system reflects accurate data. Finally, because the creation, addition of contacts, addition of relationships, selection of processes, filtering of communications, etc. are performed automatically, an accurate and intelligent relationship management system can be easily created, deployed, and adopted by users in an organization.

Figure 9:
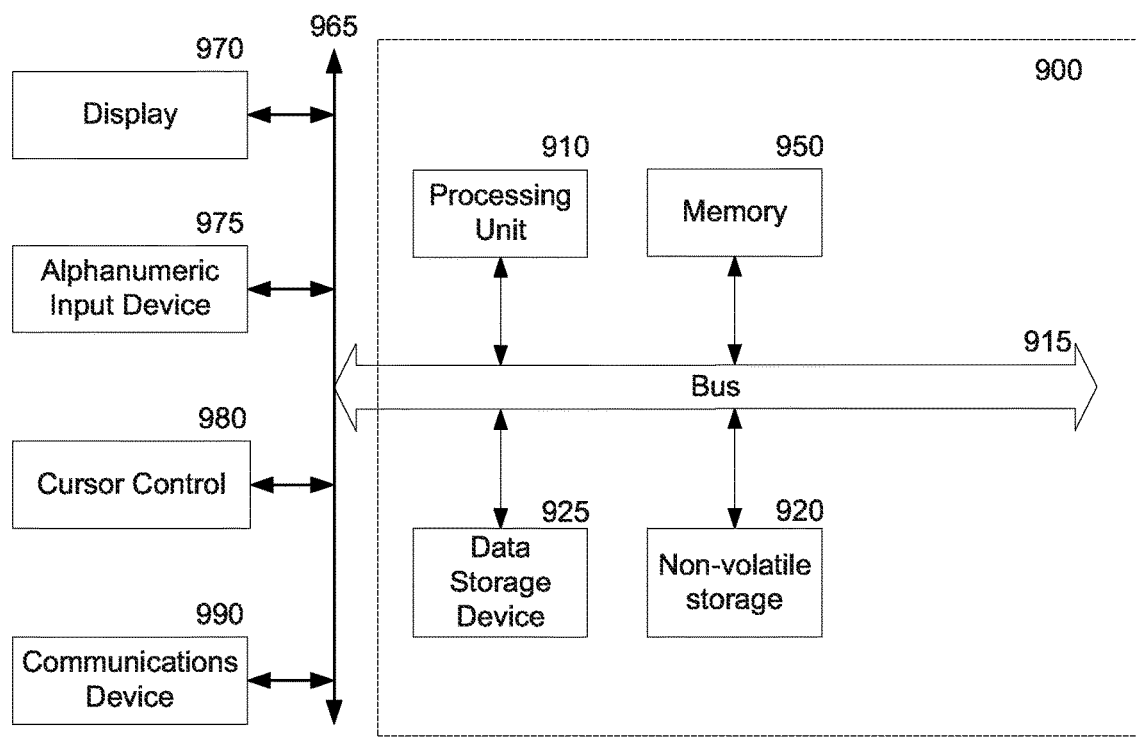
FIG. 9 is one embodiment of a computer system that may be used in accordance with an embodiment of the invention.

FIG. 9 is one embodiment of a computer system that may be used with the present invention. It will be apparent to those of ordinary skill in the art, however that other alternative systems of various system architectures may also be used.

The data processing system illustrated in FIG. 9 includes a bus or other internal communication means 915 for communicating information, and a processor 910 coupled to the bus 915 for processing information. The system further comprises a random access memory (RAM) or other volatile storage device 950 (referred to as memory), coupled to bus 915 for storing information and instructions to be executed by processor 910. Main memory 950 also may be used for storing temporary variables or other intermediate information during execution of instructions by processor 910. The system also comprises a read only memory (ROM) and/or static storage device 920 coupled to bus 915 for storing static information and instructions for processor 910, and a data storage device 925 such as a magnetic disk or optical disk and its corresponding disk drive. Data storage device 925 is coupled to bus 915 for storing information and instructions.

The system may further be coupled to a display device 970, such as a cathode ray tube (CRT) or a liquid crystal display (LCD) coupled to bus 915 through bus 965 for displaying information to a computer user. An alphanumeric input device 975, including alphanumeric and other keys, may also be coupled to bus 915 through bus 965 for communicating information and command selections to processor 910. An additional user input device is cursor control device 980, such as a touchpad, mouse, a trackball, stylus, or cursor direction keys coupled to bus 915 through bus 965 for communicating direction information and command selections to processor 910, and for controlling cursor movement on display device 970.

Another device, which may optionally be coupled to computer system 900, is a communication device 990 for accessing other nodes of a distributed system via a network. The communication device 990 may include any of a number of commercially available networking peripheral devices such as those used for coupling to an Ethernet, token ring, Internet, or wide area network. The communication device 990 may further be a null-modem connection, or any other mechanism that provides connectivity between the computer system 900 and the outside world. Note that any or all of the components of this system illustrated in FIG. 9 and associated hardware may be used in various embodiments of the present invention.

It will be appreciated by those of ordinary skill in the art that any configuration of the system may be used for various purposes according to the particular implementation. The control logic or software implementing the present invention can be stored in main memory 950, mass storage device 925, or other storage medium locally or remotely accessible to processor 910.

It will be apparent to those of ordinary skill in the art that the system, method, and process described herein can be implemented as software stored in main memory 950 or read only memory 920 and executed by processor 910. This control logic or software may also be resident on an article of manufacture comprising a computer readable medium having computer readable program code embodied therein and being readable by the mass storage device 925 and for causing the processor 910 to operate in accordance with the methods and teachings herein.

The present invention may also be embodied in a handheld or portable device containing a subset of the computer hardware components described above. For example, the handheld device may be configured to contain only the bus 915, the processor 910, and memory 950 and/or 925. The handheld device may also be configured to include a set of buttons or input signaling components with which a user may select from a set of available options. The handheld device may also be configured to include an output apparatus such as a liquid crystal display (LCD) or display element matrix for displaying information to a user of the handheld device. Conventional methods may be used to implement such a handheld device. The implementation of the present invention for such a device would be apparent to one of ordinary skill in the art given the disclosure of the present invention as provided herein.

The present invention may also be embodied in a special purpose appliance including a subset of the computer hardware components described above. For example, the appliance may include a processor 910, a data storage device 925, a bus 915, and memory 950, and only rudimentary communications mechanisms, such as a small touch-screen that permits the user to communicate in a basic manner with the device. In general, the more special-purpose the device is, the fewer of the elements need be present for the device to function.

In one embodiment, the access to electronic communications, tracking of communications, and extraction of contact, collaborator, and relationship data from the electronic communications is predicated on privacy controls maintained by a relationship management server. The privacy controls enable users to select what data should be shared with participants (i.e., relationships and collaborators) within a process, what data should be tracked, what data from one user can be shared, displayed, or used by a second user, etc. In one embodiment, these privacy controls may initially be set to a maximum degree of privacy, such that no data is shared, obtained, or tracked. A user may then opt-into one or more of the data acquisition, tracking, and sharing processes discussed herein.

It is to be understood that the above description is intended to be illustrative, and not restrictive. Many other embodiments will be apparent to those of skill in the art upon reading and understanding the above description. The scope of the invention should, therefore, be determined with reference to the appended claims, along with the full scope of equivalents to which such claims are entitled.

The foregoing description, for purpose of explanation, has been described with reference to specific embodiments. However, the illustrative discussions above are not intended to be exhaustive or to limit the invention to the precise forms disclosed. Many modifications and variations are possible in view of the above teachings. The embodiments were chosen and described in order to best explain the principles of the invention and its practical applications, to thereby enable others skilled in the art to best utilize the invention and various embodiments with various modifications as may be suited to the particular use contemplated.

We claim:
1. A computer-implemented method comprising:
   receiving, with a computing system having one or more processors and at least one memory device coupled with the one or more processors, a request from a user to modify contents of a relationship management system having a relationship management interface and a relationship management database maintained in the at least one memory device;
   receiving, with the one or more processors, specification of one or more electronic communication systems, for which the user has an account for sending and receiving electronic communications with the corresponding electronic communication system, and user access credentials that provide access to each of the corresponding accounts;

accessing, by providing user access credentials corresponding to the electronic communication system being accessed, electronic communications for the user within the electronic communication system being accessed;

obtaining, with the one or more processors, past electronic communications from each of the specified one or more electronic communication systems using the received user access credentials;

analyzing, with the one or more processors utilizing a machine learning model, the past electronic communications to extract contact data, to be added to the relationship management system, from the contents of the electronic communications, wherein the analyzing comprises at least interpreting the relationship management data, automatically culling contact information from the electronic communications, deduplicating contact information, merging contact information obtained from different sources, combining relationship analysis results obtained from different communication channels, and users, and generating process suggestions, follow-up suggestions, and team member collaboration suggestions; and adding, with the one or more processors, the contact data extracted from the electronic communications as contacts associated to the relationship management system stored in the at least one memory device for the user.

2. The computer-implemented method of claim 1, wherein analyzing the past electronic communications to extract contact data further comprises:

analyzing an electronic communication, from the obtained one or more electronic communications, to extract one or more items of contact data from contents of the electronic communication by application of a pre-trained machine learning model to the contents of the electronic communication;

determining a confidence level that the one or more items of extracted contact data correspond to an existing contact in the relationship management system, wherein the confidence level is determined by the application of the pre-trained machine learning model to the contents of the electronic communication;

adding the extracted contact data to the existing contact data based on the determined confidence level.

3. The computer implemented method of claim 2, wherein the extracted contact data is automatically added to the existing contact when the confidence level exceeds a first threshold, and a suggestion is created for the user to decide whether to add the extracted contact data to the existing contact when the confidence level exceeds a second threshold and does not exceed the first threshold.

4. The computer-implemented method of claim 2, wherein the confidence level is determined based on a combined analysis of two or more different communications from two or more different electronic communication systems.

5. The computer-implemented method of claim 2, wherein the confidence level is determined based on a combined analysis of two or more different communications associated with two more users of the created relationship management system.

6. The computer-implemented method of claim 2, wherein the pre-trained machine learning model is a natural language analysis model for analyzing the electronic communication to locate a contact signature within the electronic communication, and to extract one or more contact details from the located contact signature.

7. The computer-implemented method of claim 1, further comprising:

analyzing the past electronic communications to determine a process, to be added to the relationship management system, from the contents of the electronic communications, wherein the process is a combination of one or more relationships, one or more collaborators, and a sequential series of stages in communication between the user, the relationships, and the collaborators; and adding the determined process to the created relationship management system.

8. The computer-implemented method of claim 7, further comprising:

obtaining one or more electronic communications from the one or more electronic communication systems using a corresponding set of user access credentials;

analyzing the obtained one or more electronic communications; and filtering the obtained one or more electronic communications to one or more relationships in the determined process.

9. The computer-implemented method of claim 7, wherein analyzing and filtering further comprises:

analyzing an electronic communication from the obtained one or more electronic communications, by application of a pre-trained machine learning model to the content of electronic communication, to determine a relationship in the process to which the electronic communication likely belongs;

determining a confidence level of the determination of the relationship in the process based on results of the pre-trained machine learning model application to the electronic communication; and filtering the electronic communication to the relationship in the process based on the determined confidence level.

10. The computer-implemented method of claim 9, wherein the electronic communication is automatically filtered to the relationship in the process when the confidence level exceeds a first threshold, and a suggestion is created for the user to decide whether the electronic communication is to be filtered to the relationship in the process when the confidence level exceeds a second threshold and does not exceed the first threshold.

11. The computer-implemented method of claim 7, wherein the process is one of a sales process, a business development process, a fundraising process, or a recruitment process.

12. The computer-implemented method of claim 7, further comprising:

analyzing the past electronic communications to determine a relationship, to be added to the determined process, wherein the relationship is a contact that exchanges communication with the user within the determined process; and adding the determined relationship to the relationship management process.

13. The computer-implemented method of claim 12, further comprising:

analyzing the past electronic communications to determine a collaborator to be added to the determined process, wherein the collaborator is a second user associated with the first user that has exchanged communications with the relationship in the determined process; and adding the collaborator to the determined process.

14. The computer-implemented method of claim 1, further comprising:

receiving user specification of a process, wherein the process is a sequential series of stages in communication between the user and at least one contact; and adding the user specified process to the created relationship management system.

15. The computer-implemented method of claim 1, wherein the one or more electronic communication systems include a plurality of different types of electronic communication systems that provide electronic communication services over a plurality of different communication channels.

16. The computer-implemented method of claim 1, wherein the one or more electronic communication systems include one or more web-based electronic mail systems, one or more social networking systems, one or more blogging systems, one or more multimedia communication systems, and a cellular telephone communication system.

17. The computer-implemented method of claim 1, further comprising:

obtaining new electronic communications after creation of the relationship management system from one or more of the specified electronic communication system using the user access credentials;

analyzing the new electronic communications based on the past electronic communications; and updating the relationship management system based on analysis of the new electronic communications and the past electronic communications.

18. The computer-implemented method of claim 17, wherein the new electronic communications are obtained on a periodic basis, and the relationship management system is updated in near real time in response the new electronic communications being obtained.

19. The computer implemented method of claim 18, further comprising:

generating data for display of the relationship management system to the user; and generating updated data for display to the user in near real time as the relationship management system is updated.

20. The computer-implemented method of claim 18, wherein updating the relationship management system further comprises:

refining existing contact data extracted from the past electronic communications with contact data obtained from the new electronic communications.

21. A non-transitory computer readable storage medium including instructions that, when executed by a processor, cause the processor to perform a method comprising:

receiving, with a computing system having one or more processors and at least one memory device coupled with the one or more processors, a request from a user to modify contents of a relationship management system having a relationship management interface and a relationship management database maintained in the at least one memory device;

receiving, with the one or more processors, specification of one or more electronic communication systems, for which the user has an account for sending and receiving electronic communications with the corresponding electronic communication system, and user access credentials that provide access to each of the corresponding accounts;

accessing, by providing user access credentials corresponding to the electronic communication system being accessed, electronic communications for the user within the electronic communication system being accessed;

obtaining, with the one or more processors, past electronic communications from each of the specified one or more electronic communication systems using the received user access credentials;

analyzing, with the one or more processors utilizing a machine learning model, the past electronic communications to extract contact data, to be added to the relationship management system, from the contents of the electronic communications, wherein the analyzing comprises at least interpreting the relationship management data, automatically culling contact information from the electronic communications, deduplicating contact information, merging contact information obtained from different sources, combining relationship analysis results obtained from different communication channels, and users, and generating process suggestions, follow-up suggestions, and team member collaboration suggestions; and adding, with the one or more processors, the contact data extracted from the electronic communications as contacts associated to the relationship management system stored in the at least one memory device for the user.

22. The non-transitory computer readable storage medium of claim 21, wherein analyzing the past electronic communications to extract contact data further comprises:

analyzing an electronic communication, from the obtained one or more electronic communications, to extract one or more items of contact data from contents of the electronic communication by application of a pre-trained machine learning model to the contents of the electronic communication;

determining a confidence level that the one or more items of extracted contact data correspond to an existing contact in the relationship management system, wherein the confidence level is determined by the application of the pre-trained machine learning model to the contents of the electronic communication;

adding the extracted contact data to the existing contact data based on the determined confidence level.

23. The non-transitory computer readable storage medium of claim 22, wherein the extracted contact data is automatically added to the existing contact when the confidence level exceeds a first threshold, and a suggestion is created for the user to decide whether to add the extracted contact data to the existing contact when the confidence level exceeds a second threshold and does not exceed the first threshold.

24. The non-transitory computer readable storage medium of claim 22, wherein the confidence level is determined based on a combined analysis of two or more different communications from two or more different electronic communication systems.

25. The non-transitory computer readable storage medium of claim 22, wherein the confidence level is determined based on a combined analysis of two or more different communications associated with two more users of the created relationship management system.

26. The non-transitory computer readable storage medium of claim 22, wherein the pre-trained machine learning model is a natural language analysis model for analyzing the electronic communication to locate a contact signature within the electronic communication, and to extract one or more contact details from the located contact signature.

27. The non-transitory computer readable storage medium of claim 21, further comprising:
analyzing the past electronic communications to determine a process, to be added to the relationship management system, from the contents of the electronic communications, wherein the process is a combination of one or more relationships, one or more collaborators, and a sequential series of stages in communication between the user, the relationships, and the collaborators; and
adding the determined process to the created relationship management system.

28. The non-transitory computer readable storage medium of claim 27, further comprising:
obtaining one or more electronic communications from the one or more electronic communication systems using a corresponding set of user access credentials;
analyzing the obtained one or more electronic communications; and
filtering the obtained one or more electronic communications to one or more relationships in the determined process.

29. The non-transitory computer readable storage medium of claim 27, wherein analyzing and filtering further comprises:
analyzing an electronic communication from the obtained one or more electronic communications, by application of a pre-trained machine learning model to the content of electronic communication, to determine a relationship in the process to which the electronic communication likely belongs;
determining a confidence level of the determination of the relationship in the process based on results of the pre-trained machine learning model application to the electronic communication; and
filtering the electronic communication to the relationship in the process based on the determined confidence level.

30. The non-transitory computer readable storage medium of claim 29, wherein the electronic communication is automatically filtered to the relationship in the process when the confidence level exceeds a first threshold, and a suggestion is created for the user to decide whether the electronic communication is to be filtered to the relationship in the process when the confidence level exceeds a second threshold and does not exceed the first threshold.

31. The non-transitory computer readable storage medium of claim 27, wherein the process is one of a sales process, a business development process, a fundraising process, or a recruitment process.

32. The non-transitory computer readable storage medium of claim 27, further comprising:
analyzing the past electronic communications to determine a relationship, to be added to the determined process, wherein the relationship is a contact that exchanges communication with the user within the determined process; and
adding the determined relationship to the relationship management process.

33. The non-transitory computer readable storage medium of claim 32, further comprising:
analyzing the past electronic communications to determine a collaborator to be added to the determined process, wherein the collaborator is a second user associated with the first user that has exchanged communications with the relationship in the determined process; and
adding the collaborator to the determined process.

34. The non-transitory computer readable storage medium of claim 21, further comprising:
receiving user specification of a process, wherein the process is a sequential series of stages in communication between the user and at least one contact; and
adding the user specified process to the created relationship management system.

35. The non-transitory computer readable storage medium of claim 21, wherein the one or more electronic communication systems include a plurality of different types of electronic communication systems that provide electronic communication services over a plurality of different communication channels.

36. The non-transitory computer readable storage medium of claim 21, wherein the one or more electronic communication systems include one or more web-based electronic mail systems, one or more social networking systems, one or more blogging systems, one or more multimedia communication systems, and a cellular telephone communication system.

37. The non-transitory computer readable storage medium of claim 21, further comprising:
obtaining new electronic communications after creation of the relationship management system from one or more of the specified electronic communication system using the user access credentials;
analyzing the new electronic communications based on the past electronic communications; and
updating the relationship management system based on analysis of the new electronic communications and the past electronic communications.

38. The non-transitory computer readable storage medium of claim 37, wherein the new electronic communications are obtained on a periodic basis, and the relationship management system is updated in near real time in response the new electronic communications being obtained.

39. The non-transitory computer readable storage medium of claim 38, further comprising:
generating data for display of the relationship management system to the user; and
generating updated data for display to the user in near real time as the relationship management system is updated.

40. The non-transitory computer readable storage medium of claim 38, wherein updating the relationship management system further comprises:
refining existing contact data extracted from the past electronic communications with contact data obtained from the new electronic communications.

41. A system comprising:
a memory; and
a processor coupled with the memory to receive a request from a user to modify contents of a relationship management system having a relationship management interface and a relationship management database maintained in the memory;
receive, with the processor, specification of one or more electronic communication systems, for which the user has an account for sending and receiving electronic communications with the corresponding electronic communication system, and user access credentials that provide access to each of the corresponding accounts;
access, by providing user access credentials corresponding to the electronic communication system being accessed, electronic communications for the user within the electronic communication system being accessed;

obtain, with the processor, past electronic communications from each of the specified one or more electronic communication systems using the received user access credentials;

analyze, with the one or more processors utilizing a machine learning model, the past electronic communications to extract contact data, to be added to the relationship management system, from the contents of the electronic communications, wherein the analyzing comprises at least interpreting the relationship management data, automatically culling contact information from the electronic communications, deduplicating contact information, merging contact information obtained from different sources, combining relationship analysis results obtained from different communication channels, and users, and generating process suggestions, follow-up suggestions, and team member collaboration suggestions; and add, with the processor, the contact data extracted from the electronic communications as contacts associated to the relationship management system stored in the memory for the user.

\* \* \* \* \*